United States Patent
Oka et al.

(10) Patent No.: US 10,809,703 B2
(45) Date of Patent: Oct. 20, 2020

(54) MANAGEMENT SYSTEM AND MANAGEMENT METHOD

(71) Applicant: OMRON Corporation, Kyoto (JP)

(72) Inventors: Minoru Oka, Moriyama (JP); Yoshiaki Kobayashi, Kawachinagano (JP); Tatsuya Hirota, Kyoto (JP); Naohiro Akiyama, Muko (JP)

(73) Assignee: OMRON Corporation, Kyoto (JP)

( * ) Notice: Subject to any disclaimer, the term of this patent is extended or adjusted under 35 U.S.C. 154(b) by 105 days.

(21) Appl. No.: 15/744,846

(22) PCT Filed: Aug. 10, 2016

(86) PCT No.: PCT/JP2016/073559
§ 371 (c)(1),
(2) Date: Jan. 15, 2018

(87) PCT Pub. No.: WO2017/056749
PCT Pub. Date: Apr. 6, 2017

(65) Prior Publication Data
US 2018/0356804 A1    Dec. 13, 2018

(30) Foreign Application Priority Data

Sep. 28, 2015  (JP) .................................. 2015-190417
Dec. 1, 2015   (JP) .................................. 2015-235148

(51) Int. Cl.
*G05B 19/418*  (2006.01)
*G06Q 50/04*  (2012.01)
(Continued)

(52) U.S. Cl.
CPC ..... *G05B 19/41875* (2013.01); *G05B 19/418* (2013.01); *G05B 19/4183* (2013.01);
(Continued)

(58) Field of Classification Search
CPC ............ G05B 19/41875; G05B 19/418; G05B 19/4183; G05B 19/41865; G06Q 10/06;
(Continued)

(56) References Cited

U.S. PATENT DOCUMENTS 7,008,300 B1 * 3/2006 Molnar ................. B24B 37/013
                                                  257/E21.23
10,217,120 B1 * 2/2019 Shin .................... G06Q 30/0201
(Continued)

FOREIGN PATENT DOCUMENTS

CN        1463393       12/2003
CN       101350083       1/2009
(Continued)

OTHER PUBLICATIONS

"International Search Report (Form PCT/ISA/210) of PCT/JP2016/073559", dated Nov. 1, 2016, with English translation thereof, pp. 1-3.
(Continued)

*Primary Examiner* — Thomas C Lee
*Assistant Examiner* — Michael Tang
(74) *Attorney, Agent, or Firm* — JCIPRNET

(57) ABSTRACT

Provided is a management system associated with a manufacturing line including one or more facilities. Each of the facilities is configured to process each workpiece according to order information. The management system includes: a collecting means for collecting event information about a process that takes place in each of the facilities; a classifying means for classifying, on the basis of a generation source and content of each piece of event information, the event information collected by the collecting means, into sets of event information generated due to the same workpiece; a generation means for generating data which represents process circumstances for each workpiece on the basis of the (Continued)

event information belonging to each of the sets classified by the classifying means; and a visualizing means for visualizing process progression circumstances for each workpiece processed according to the order information, on the basis of the data generated by the generating means.

22 Claims, 27 Drawing Sheets

(51) Int. Cl.
  *G06Q 10/06* (2012.01)
  *G06Q 10/08* (2012.01)
(52) U.S. Cl.
  CPC ....... *G05B 19/41865* (2013.01); *G06Q 10/06* (2013.01); *G06Q 10/06315* (2013.01); *G06Q 10/087* (2013.01); *G06Q 50/04* (2013.01); *Y02P 90/18* (2015.11); *Y02P 90/28* (2015.11); *Y02P 90/30* (2015.11)
(58) Field of Classification Search
  CPC ........... G06Q 10/06315; G06Q 10/087; G06Q 50/04; Y02P 90/18; Y02P 90/28; Y02P 90/30
  See application file for complete search history.

(56) References Cited

U.S. PATENT DOCUMENTS

| | | | |
|---|---|---|---|
| 2002/0059110 A1* | 5/2002 | Yamamoto | G06Q 10/08 705/26.1 |
| 2004/0148047 A1* | 7/2004 | Dismukes | G05B 19/41865 700/100 |
| 2005/0017875 A1 | 1/2005 | Nakayama et al. | |
| 2006/0149407 A1 | 7/2006 | Markham et al. | |
| 2006/0259514 A1 | 11/2006 | Weinrich et al. | |
| 2009/0024239 A1* | 1/2009 | Yoshioka | G06Q 10/06 700/110 |
| 2010/0279436 A1* | 11/2010 | Fu | H01L 22/12 438/14 |
| 2014/0042137 A1* | 2/2014 | Daniel | B23K 9/0953 219/130.5 |
| 2015/0153730 A1 | 6/2015 | Nishimura et al. | |
| 2015/0312427 A1* | 10/2015 | Roulland | H04N 1/00344 358/1.15 |

FOREIGN PATENT DOCUMENTS

| | | | |
|---|---|---|---|
| CN | 103567226 | | 2/2014 |
| CN | 104678948 | | 6/2015 |
| JP | 2007072726 A | * | 3/2007 |
| JP | 2010-182015 | | 8/2010 |
| JP | 2011-253469 | | 12/2011 |
| JP | 2014-174701 | | 9/2014 |

OTHER PUBLICATIONS

"Written Opinion of the International Searching Authority (Form PCT/ISA/237)" of PCT/JP2016/073559, dated Nov. 1, 2016, with English translation thereof, pp. 1-8.
"Search Report of Europe Counterpart Application", dated Mar. 7, 2019, p. 1-p. 8.
"Office Action of China Counterpart Application," with English translation thereof, dated Oct. 9, 2019, p. 1-p. 25.
"Office Action of Europe Counterpart Application", dated May 4, 2020, p. 1-p. 6.

* cited by examiner

| ORDER NO. | PRODUCT TYPE CODE | OPTION CODE | QUANTITY |
|---|---|---|---|
| A0001 | AB123 | 0000 | 50 |
| A0002 | AC546 | 0001 | 30 |
| ⌇ | ⌇ | ⌇ | ⌇ |

| ID:0002 | | |
|---|---|---|
| 2015/09/01 09:00:15 | [From_Facility_01] | <NORMAL> | MACHINING CYCLE HAS STARTED |
| 2015/09/01 09:01:50 | [From_Facility_01] | <NORMAL> | MACHINING CYCLE HAS COMPLETED |
| 2015/09/01 09:02:00 | [From_Facility_02] | <NORMAL> | (START OF AUTOMATIC PRODUCTION) |
| 2015/09/01 09:04:15 | [From_Facility_02] | <NORMAL> | (COMPLETION OF AUTOMATIC PRODUCTION) |
| 2015/09/01 09:04:22 | [From_Facility_03] | <NORMAL> | The starting of processes has completed. |
| 2015/09/01 09:04:35 | [From_Facility_03] | <NORMAL> | The processes have completed successfully. |
| ... | ... | ... | ... |

Table 290:

| WORKPIECE IDENTIFICATION NO. | FACILITY 1 PROCESS START | FACILITY 1 PROCESS COMPLETION | FACILITY 2 PROCESS START | FACILITY 2 PROCESS COMPLETION | FACILITY 3 PROCESS START | FACILITY 3 PROCESS COMPLETION | FACILITY 4 PROCESS START | FACILITY 4 PROCESS COMPLETION | ORDER NO. | WORKPIECE NO. |
|---|---|---|---|---|---|---|---|---|---|---|
| 0002 | 2015/09/01 09:00:15 | 2015/09/01 09:01:50 | 2015/09/01 09:02:00 | 2015/09/01 09:04:15 | 2015/09/01 09:04:22 | 2015/09/01 09:04:35 | 2015/09/01 09:04:50 | 2015/09/01 09:06:05 | A0001 | 01 |
| 0003 | 2015/09/01 09:00:30 | 2015/09/01 09:02:05 | 2015/09/01 09:02:16 | 2015/09/01 09:04:32 | 2015/09/01 09:04:40 | 2015/09/01 09:04:51 | 2015/09/01 09:05:10 | 2015/09/01 09:06:25 | A0001 | 02 |
| 0004 | 2015/09/01 09:00:45 | 2015/09/01 09:02:20 | 2015/09/01 09:02:35 | 2015/09/01 09:04:50 | 2015/09/01 09:05:00 | 2015/09/01 09:05:10 | 2015/09/01 09:05:30 | 2015/09/01 09:06:50 | A0001 | 03 |
| 0005 | 2015/09/01 09:01:05 | 2015/09/01 09:02:40 | 2015/09/01 09:02:55 | 2015/09/01 09:05:05 | 2015/09/01 09:05:20 | 2015/09/01 09:05:30 | 2015/09/01 09:05:55 | 2015/09/01 09:07:10 | A0001 | 04 |
| ... | ... | ... | ... | ... | ... | ... | ... | ... | ... | ... |

(1) COMPARISON
(2) ORDER NUMBER DETERMINATION
(3) FIRST WORKPIECE DETERMINATION
(4) WORKPIECE NUMBER IMPARTMENT

Table 400:

| START TIME | COMPLETION TIME | ORDER NO. | PRODUCT TYPE CODE | OPTION CODE | QUANTITY |
|---|---|---|---|---|---|
| 2015/09/01 08:15:00 | 2015/09/01 08:58:50 | Z0099 | BB789 | 0 | 20 |
| 2015/09/01 09:00:00 | 2015/09/01 09:55:20 | A0001 | AB123 | 0 | 50 |
| 2015/09/01 09:58:30 | 2015/09/01 10:45:20 | A0002 | AC546 | 1 | 30 |

FIG. 11

| ORDER NO.: A0001 | | WORKPIECE NO.: 01 | |
|---|---|---|---|
| 2015/09/01 09:00:15 | [From_Facility_01] | ⟨NORMAL⟩ | MACHINING CYCLE HAS STARTED |
| 2015/09/01 09:01:50 | [From_Facility_01] | ⟨NORMAL⟩ | MACHINING CYCLE HAS COMPLETED |
| 2015/09/01 09:02:00 | [From_Facility_02] | ⟨NORMAL⟩ | (START OF AUTOMATIC PRODUCTION) |
| 2015/09/01 09:04:15 | [From_Facility_02] | ⟨NORMAL⟩ | (COMPLETION OF AUTOMATIC PRODUCTION) |
| 2015/09/01 09:04:22 | [From_Facility_03] | ⟨NORMAL⟩ | The starting of processes has completed. |
| 2015/09/01 09:04:35 | [From_Facility_03] | ⟨NORMAL⟩ | The processes have completed successfully. |
| ... | ... | ... | ... |

FIG. 13

| WORKPIECE IDENTIFICATION NO. | FACILITY 1 PROCESS START | FACILITY 1 PROCESS COMPLETION | FACILITY 2 PROCESS START | FACILITY 2 PROCESS COMPLETION | FACILITY 3 PROCESS START | FACILITY 3 PROCESS COMPLETION | FACILITY 4 PROCESS START | FACILITY 4 PROCESS COMPLETION | ORDER NO. | WORKPIECE NO. |
|---|---|---|---|---|---|---|---|---|---|---|
| 0002 | 2015/09/01 09:00:15 | 2015/09/01 09:01:50 | 2015/09/01 09:02:00 | INTERPOLATE (ESTIMATE) | 2015/09/01 09:04:22 | 2015/09/01 09:04:35 | 2015/09/01 09:04:50 | 2015/09/01 09:06:05 | A0001 | 01 |
| 0003 | 2015/09/01 09:00:30 | 2015/09/01 09:02:05 | 2015/09/01 09:02:16 | | 2015/09/01 09:04:40 | 2015/09/01 09:04:51 | 2015/09/01 09:05:10 | 2015/09/01 09:06:25 | A0001 | 02 |
| 0004 | 2015/09/01 09:00:45 | 2015/09/01 09:02:20 | 2015/09/01 09:02:35 | | 2015/09/01 09:05:00 | 2015/09/01 09:05:10 | 2015/09/01 09:05:30 | 2015/09/01 09:06:50 | A0001 | 03 |
| 0005 | 2015/09/01 09:01:05 | 2015/09/01 09:02:40 | 2015/09/01 09:02:55 | | 2015/09/01 09:05:20 | 2015/09/01 09:05:30 | 2015/09/01 09:05:55 | 2015/09/01 09:07:10 | A0001 | 04 |
| ... | ... | ... | ... | ... | ... | ... | ... | ... | ... | ... |

| | 001-0001 | 001-0002 | 001-0003 | 001-0004 | ... |
|---|---|---|---|---|---|
| 2015/09/01 08:59:50 | OFF | 0.00 | 0.00 | 0.1 | |
| 2015/09/01 08:59:55 | OFF | 0.00 | 0.00 | 0.1 | |
| 2015/09/01 09:00:00 | OFF | 0.00 | 0.00 | 0.1 | |
| 2015/09/01 09:00:05 | OFF | 0.00 | 0.00 | 0.1 | |
| 2015/09/01 09:00:10 | ON | 12.50 | 30.00 | 0.1 | |
| 2015/09/01 09:00:15 | ON | 12.49 | 30.50 | 5.2 | |
| 2015/09/01 09:00:20 | ON | 12.51 | 30.20 | 5.3 | |
| 2015/09/01 09:00:25 | OFF | 0.00 | 0.00 | 5.4 | |
| 2015/09/01 09:00:30 | OFF | 0.00 | 0.00 | 5.3 | |
| 2015/09/01 09:00:35 | OFF | 0.00 | 0.00 | 0.1 | |
| 2015/09/01 09:00:40 | OFF | 0.00 | 0.00 | 0.1 | |
| 2015/09/01 09:00:45 | OFF | 0.00 | 0.00 | 0.1 | |
| 2015/09/01 09:00:50 | OFF | 0.00 | 0.00 | 0.1 | |
| 2015/09/01 09:00:55 | OFF | 0.00 | 0.00 | 0.1 | |
| 2015/09/01 09:01:00 | OFF | 0.00 | 0.00 | 0.1 | |
| ... | | | | | |

700 — RESULT OF ENTITY MANAGEMENT PROCESS

| | 001-0001 | 001-0002 | 001-0003 | 001-0004 | ... |
|---|---|---|---|---|---|
| 2015/09/01 08:59:50 | OFF | 0.00 | 0.00 | 0.1 | |
| 2015/09/01 08:59:55 | OFF | 0.00 | 0.00 | 0.1 | |
| 2015/09/01 09:00:00 | OFF | 0.00 | 0.00 | 0.1 | |
| 2015/09/01 09:00:05 | OFF | 0.00 | 0.00 | 0.1 | |
| 2015/09/01 09:00:10 | OFF | 0.00 | 0.00 | 0.1 | |
| 2015/09/01 09:00:15 | ON | 12.50 | 30.00 | 0.1 | |
| 2015/09/01 09:00:20 | ON | 12.49 | 30.50 | 5.2 | |
| 2015/09/01 09:00:25 | ON | 12.51 | 30.20 | 5.3 | |
| 2015/09/01 09:00:30 | OFF | 0.00 | 0.00 | 5.4 | |
| 2015/09/01 09:00:35 | OFF | 0.00 | 0.00 | 5.3 | |
| 2015/09/01 09:00:40 | OFF | 0.00 | 0.00 | 0.1 | |
| 2015/09/01 09:00:45 | OFF | 0.00 | 0.00 | 0.1 | |
| 2015/09/01 09:00:50 | OFF | 0.00 | 0.00 | 0.1 | |
| 2015/09/01 09:00:55 | OFF | 0.00 | 0.00 | 0.1 | |
| 2015/09/01 09:01:00 | OFF | 0.00 | 0.00 | 0.1 | |
| ... | | | | | |

(1) ASSOCIATION WITH WORKPIECE
ORDER NO.: A0001
WORKPIECE NO.: 0002

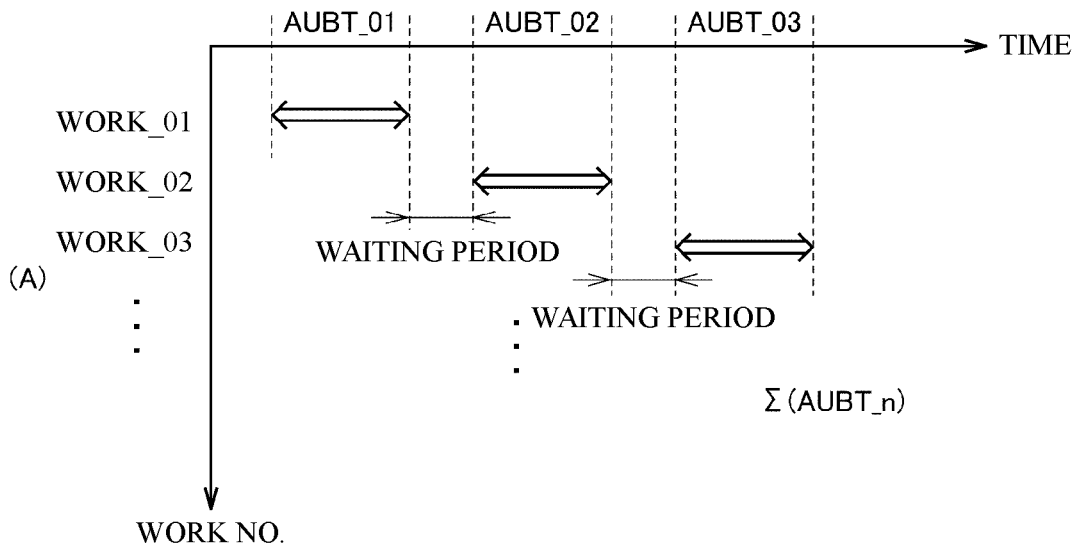
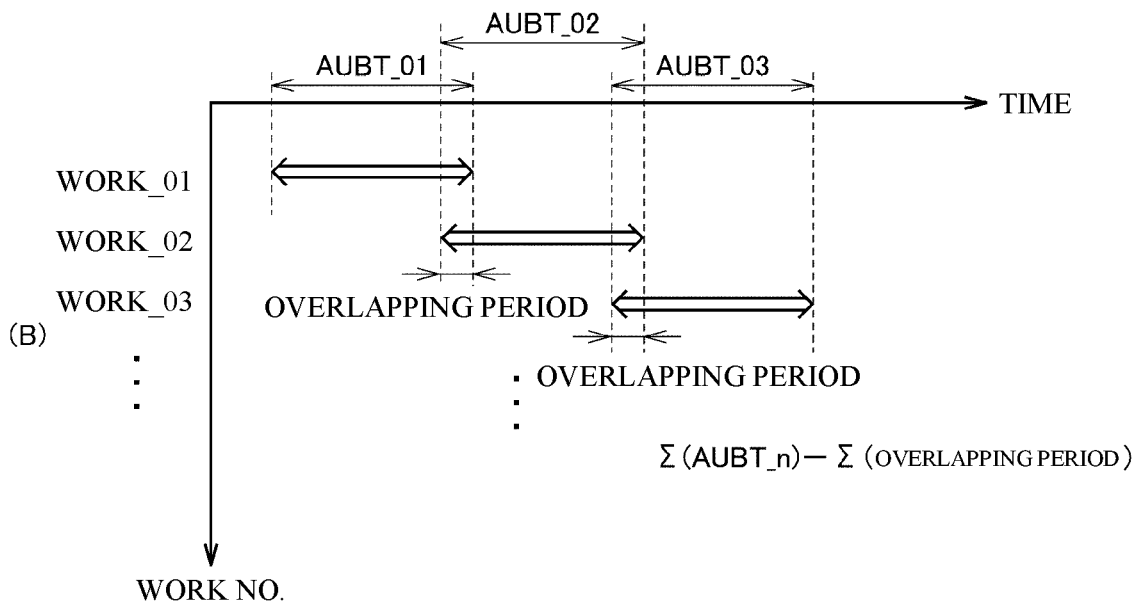
FIG. 23

MANAGEMENT SYSTEM AND MANAGEMENT METHOD

CROSS-REFERENCE TO RELATED APPLICATION

This application is a 371 of international application of PCT application serial no. PCT/JP2016/073559, filed on Aug. 10, 2016, which claims the priority benefit of Japanese Patent Application Laid-Open (JP-A) no. 2015-235148, filed on Dec. 1, 2015, and JP-A no. 2015-190417, filed on Sep. 28, 2015. The entirety of each of the abovementioned patent applications is hereby incorporated by reference herein and made a part of this specification.

BACKGROUND

Technical Field

The present invention relates to a management system including a plurality of control devices, and a management method.

Related Art

With the recent advancement of information and communication technology (ICT), further improvement of production management at a manufacturing site is desired.

For example, Japanese Patent Application Laid-Open (JP-A) No. 2014-174701 (Patent Literature 1) discloses a configuration for more efficiently performing analysis of various information that is managed by a control system and image data of a corresponding target.

CITATION LIST

Patent Literature

Patent Literature 1: Japanese Patent Application Laid-Open No. 2014-174701

SUMMARY

In an actual manufacturing site, a plurality of facilities perform respective processes on the same workpiece to manufacture semi-finished products, or products. There are a large number of manufacturing sites at which improvements such as refurbishment, remodeling, and expansion of existing facilities is performed, and it is difficult to unitarily manage a plurality of facilities that process a single workpiece. Further, for workpieces with a low product price, production management is not performed for each workpiece, but the production management is performed in units called "orders" in which a predetermined number of the same type of workpieces are grouped.

In such production management in units of orders, even when a problem occurs in a certain order unit, one of the plurality of workpieces included in the order in which the problem occurs cannot be easily recognized.

Therefore, a management system capable of realizing finer production management even at a manufacturing site at which production management is performed in units of orders is required. Further, a management system capable of objectively evaluating and managing each manufacturing site is required.

According to an embodiment of the present invention, a management system associated with a manufacturing line including one or a plurality of facilities is provided. Each of the one or plurality of facilities is configured to process individual workpieces according to order information including designation of a type of manufacturing targets and designation of the number of manufacturing targets. The management system includes a collecting means for collecting event information regarding a process generated in each of the one or plurality of facilities; a classifying means for classifying the event information collected by the collecting means into a set of event information generated due to the same workpiece on the basis of a generation source and content of each piece of event information; a generation means for generating data indicating a process status of each workpiece on the basis of event information belonging to each of sets classified by the classification means; and a visualizing means for visualizing a progress status of a process for each workpiece to be processed according to the order information on the basis of the data generated by the generation means.

According to the embodiment, finer production management can be realized even at a manufacturing site at which production management is performed in units of orders.

Preferably, the classifying means classifies the collected event information according to a configuration in the manufacturing line of the one or the plurality of facilities. By adopting such a configuration, it is possible to perform appropriate classification according to a configuration in the manufacturing line.

Preferably, when the classifying means receives event information having the same content from the same generation source a plurality of times, the classifying means classifies the event information into event information caused by different workpieces. By adopting such a configuration, it is possible to prevent a plurality of pieces of event information caused by different workpieces from being erroneously associated with the same workpiece.

Preferably, the visualizing means reproduces processing progress of each workpiece on the manufacturing line on a plane that is defined by an axis associated with process and an axis of time. By adopting such a configuration, it is possible to recognize progress of a process at a glance.

Preferably, the visualizing means displays a list of event information classified into a set corresponding to the selected workpiece. By adopting such a configuration, it is possible to facilitate investigation of causes, for example, when a problem has occurred in any of the workpieces.

Preferably, the generation means specifies an order number to which the set classified by the classifying means belongs and a workpiece number within the order on the basis of information on a time included in the order information. By adopting such a configuration, it is possible to specify an order to which each workpiece belongs even when each facility does not hold information on the order number.

Preferably, the collecting means further collects field information that is acquired in the one or the plurality of facilities, and the generation unit executes a process of associating the collected field information with a corresponding workpiece.

Preferably, the visualizing means displays the associated field information in response to selection of the workpiece.

Preferably, the management system further includes a monitoring means for comparing pieces of field information associated with a plurality of workpieces in a predetermined facility with each other to monitor a problem that can occur in the facility.

According to another embodiment of the present invention, a management method in a manufacturing line including one or a plurality of facilities is provided. Each of the one or plurality of facilities are configured to process individual workpieces according to order information including designation of a type of manufacturing targets and designation of the number of manufacturing targets. The management method includes: a step of collecting event information regarding a process generated in each of the one or plurality of facilities; a step of classifying the event information collected in the collecting step into a set of event information generated due to the same workpiece on the basis of a generation source and content of each piece of event information; a step of generating data indicating a process status of each workpiece on the basis of event information belonging to each of sets classified in the classifying step; and a step of visualizing a progress status of a process for each workpiece to be processed according to the order information on the basis of the data generated in the generating step.

According to still another embodiment of the present invention, a management system associated with a manufacturing line including one or a plurality of facilities is provided. Each of the one or plurality of facilities are configured to process individual workpieces according to order information including designation of a type of manufacturing targets and designation of the number of manufacturing targets. The management system includes a collecting means for collecting event information generated in each of the one or plurality of facilities; a calculation unit for calculating a time at which a process is actually performed on each workpiece in each of the one or plurality of facilities on the basis of the event information collected by the collecting means; and a determination means for determining an allocation ratio that is defined as a key performance indicator (KPI) on the basis of a time required for a process according to the order information and the time calculated by the calculation means.

According to the embodiment, each manufacturing site can be objectively evaluated and managed.

Preferably, the calculation means calculates a time when the process has been actually performed from an integrated value of a period from start of the process to completion of the process in a target facility, for each of one or a plurality of workpieces processed according to the same order information. By adopting such a configuration, it is possible to more accurately calculate the allocation ratio of each facility.

Preferably, the determination means determines another indicator that is defined as a KPI, in addition to the allocation ratio, and the management system further includes a display means for displaying a plurality of indicators determined by the determination means side by side or in an overlapping manner. By adopting such a configuration, it is possible to recognize an operating state of each facility from each of a plurality of indicators at a glance.

Preferably, the management system is associated with a plurality of manufacturing lines, and the display means displays indicators calculated for each of the plurality of manufacturing lines side by side or in an overlapping manner. By adopting such a configuration, it is possible to compare the operating states of the plurality of manufacturing lines with each other at a glance.

According to still another embodiment of the present invention, a management method in a manufacturing line including one or a plurality of facilities is provided. Each of the one or plurality of facilities are configured to process individual workpieces according to order information including designation of a type of manufacturing targets and designation of the number of manufacturing targets. The management method includes: a step of collecting event information generated in each of the one or plurality of facilities; a step of calculating a time at which a process is actually performed on each workpiece in each of the one or plurality of facilities on the basis of the event information collected in the collection step; and a step of determining an allocation ratio that is defined as a key performance indicator (KPI) on the basis of a time required for a process according to the order information and the time calculated in the calculating step.

According to an embodiment of the present invention, finer production management can be realized even at a manufacturing site at which production management is performed in units of orders.

According to another embodiment of the present invention, each manufacturing site can be objectively evaluated and managed.

BRIEF DESCRIPTION OF THE DRAWINGS

FIG. 10 is a schematic diagram illustrating a part of an analysis process for realizing the entity management process in the management system according to the embodiment.

FIG. 11 is a schematic diagram illustrating a process for an event information set for each piece of workpiece identification information illustrated in FIG. 10.

FIG. 13 is a diagram illustrating an example of log information that is developed from a time chart illustrated in FIG. 12 and displayed.

FIG. 14 is a schematic diagram illustrating an interpolation process for realizing an entity management process in the management system according to the embodiment.

FIG. 18 is a schematic diagram illustrating an example of field information that is collected in the management system according to the embodiment.

FIG. 19 is a schematic diagram illustrating an example of an association process for field information in the management system according to the embodiment.

FIG. 23 is a schematic diagram illustrating a method of calculating an actual unit busy time of a device in the management system according to the embodiment.

DETAILED DESCRIPTION

Figure 1:
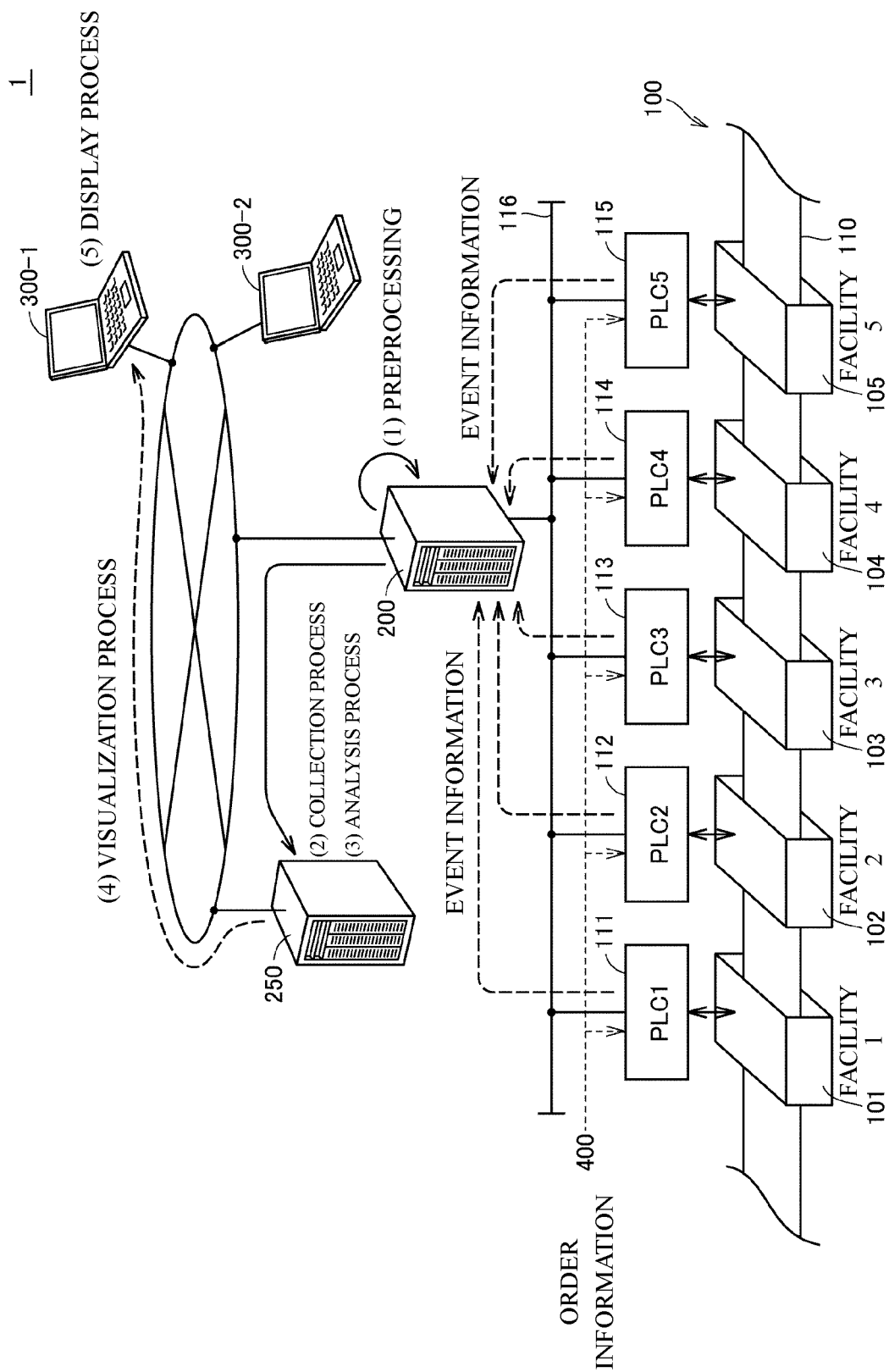
FIG. 1 is a schematic diagram illustrating a configuration example of a management system according to this embodiment.

Embodiments of the present invention will be described in detail with reference to the drawings. In the drawings, the same or corresponding parts are denoted by the same reference numerals, and description thereof will not be repeated.

<A. Configuration Example of Management System>

First, a configuration example of a management system according to an embodiment will be described. FIG. 1 is a schematic diagram illustrating a configuration example of a management system according to the embodiment. Referring to FIG. 1, a management system 1 is associated with a manufacturing line 100 including a plurality of facilities, and provides a production management function in the manufacturing line 100. The manufacturing line 100 illustrated in FIG. 1 illustrates an example in which facilities 101 to 105 are arranged along a conveyor 110 for transporting a workpiece. In FIG. 1, the facilities 101 to 105 are also referred to as "facility 1" to "facility 5." Respective operations of the facilities 101 to 105 are controlled and monitored by programmable logic controllers (PLCs) 111 to 115 which are examples of control devices. In FIG. 1, the PLCs 111 to 115 are also referred to as "PLC1" to "PLC5."

The PLCs 111 to 115 are connected via a local network 116 so that the PLCs 111 to 115 can perform data communication, and transmit various pieces of data (such as event information) to a relay server device 200 on the local network 116 according to a condition designated in advance.

The relay server device 200 performs predetermined preprocessing on the event information received from each of the PLCs 111 to 115, and transmits preprocessed information to a collection and analysis server device 250.

The collection and analysis server device 250 collects the information received from the relay server device 200 and analyzes the collected information. The collection and analysis server device 250 outputs an analysis result in response to a request from the terminal devices 300-1 and 300-2 (hereinafter also referred to as a "terminal device 300").

In FIG. 1, a configuration in which a PLC is provided in each of a plurality of facilities installed in a single manufacturing line 100, and each PLC is connected to the relay server device 200 via the same local network 116 is illustrated as a typical example, but the present invention is not limited thereto. For example, a configuration in which a plurality of PLCs are directly connected to the collection and analysis server device 250 without arranging the relay server device 200 may be adopted. In this case, each PLC transmits necessary information to the collection and analysis server device 250.

Alternatively, a plurality of relay server devices 200 may be provided. In this case, any of the relay server devices 200 relays data exchange between some of the PLCs and the collection and analysis server device 250, and the other relay server devices 200 may relay data exchange between the remaining PLCs and the collection and analysis server device 250.

<B. Hardware Configuration Example of PLC>

Next, a hardware configuration example of the PLC will be described. The plurality of PLCs arranged in the manufacturing line 100 illustrated in FIG. 1 do not need to be of the same model, but rather it is assumed that manufacturers and models are not unified. The management system 1 according to the embodiment has a function of absorbing the difference between manufacturers and models of such PLCs. Here, a hardware configuration of a typical PLC will be exemplified.

Figure 2:
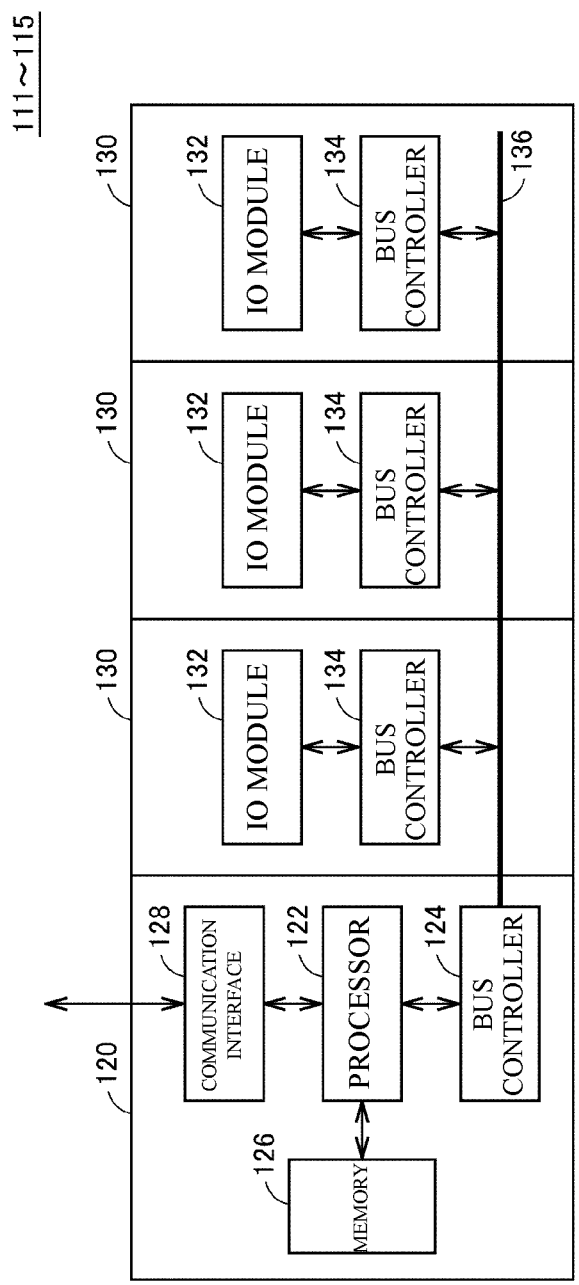
FIG. 2 is a schematic diagram illustrating an example of a hardware configuration of a PLC that is used in the management system according to the embodiment.

FIG. 2 is a schematic diagram illustrating an example of a hardware configuration of a PLC that is used in the management system 1 according to the embodiment. Referring to FIG. 2, the PLC includes a calculation unit 120 and one or more functional units 130. The calculation unit 120 is a calculation unit that executes a prestored user program or the like, obtains field information (details will be described below) from the functional unit 130, and outputs a necessary control signal through the functional unit 130.

The calculation unit 120 includes a processor 122 that executes the user program or the like; a memory 126 that stores the user program, an operating system (OS), various pieces of data, and the like; a bus controller 124 that controls exchange of data via an internal bus 136; and a communication interface 128. The memory 126 may be formed by combining a volatile storage device such as a dynamic random access memory (DRAM) and a nonvolatile storage device such as a flash memory.

The communication interface 128 may include one or more communication ports according to a device that is a target with which data is exchanged. For example, a communication port conforming to Ethernet (registered trademark) for connecting to the local network 116 (see FIG. 1), a communication port conforming to a Universal Serial Bus (USB) for connecting to a personal computer, or the like, and a communication port that supports serial and parallel lines are mounted.

The functional unit 130 may provide an input and output (IO) function for exchanging various types of information with the facility that is a control target. Specifically, functions such as digital input (DI) for receiving a digital signal, digital output (DO) for outputting a digital signal, analog input (AI) for receiving an analog signal, and analog output (AO) for outputting an analog signal may be implemented. Further, special functions such as proportional integral derivative (PID) control and motion control may be implemented.

For example, each of the functional units 130 providing the IO function includes an IO module 132, and a bus controller 134 for controlling the exchange of data between the 10 module 132 and the calculation unit 120 via the internal bus 136.

In the management system 1 according to the embodiment, any PLC may be adopted as long as the PLC includes an interface for outputting internal information to an external device using any communication means. A hardware configuration of the PLC is not limited to the configuration illustrated in FIG. 2, and an arbitrary configuration can be adopted.

<C. Hardware Configuration Example of Relay Server Device 200>

Next, a hardware configuration example of the relay server device 200 will be described. Typically, the relay server device 200 is configured by a general-purpose computer.

Figures 3, 4:
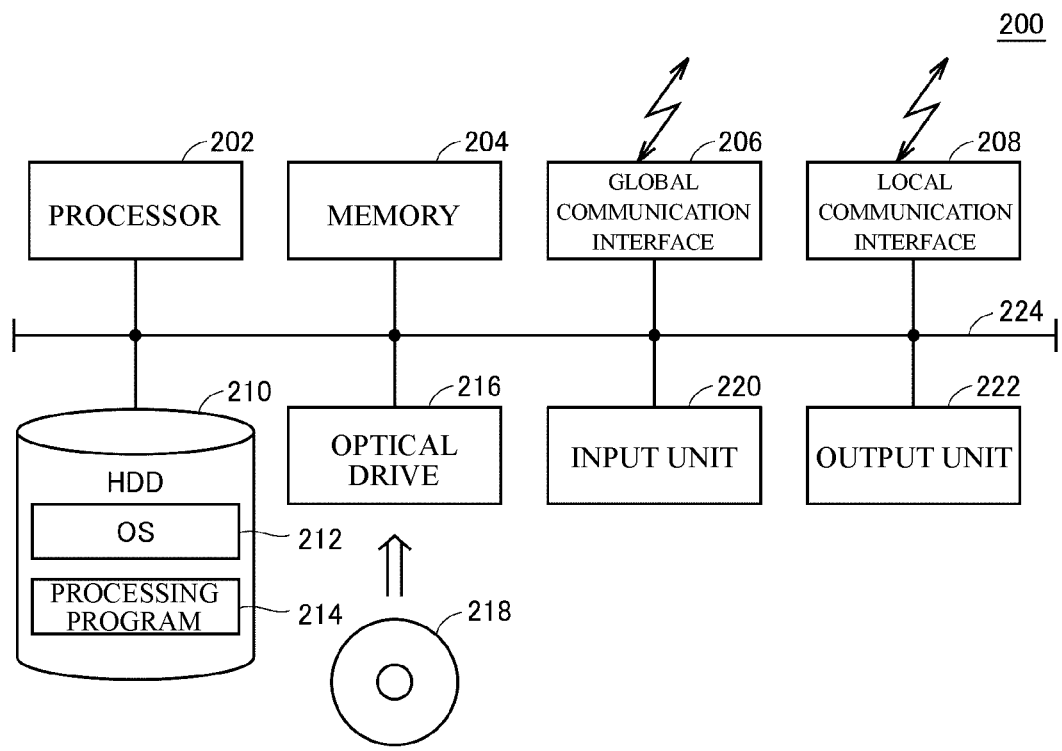
FIG. 3 is a schematic diagram illustrating an example of a hardware configuration of a relay server device that is used in the management system according to the embodiment.
FIG. 4 is a schematic diagram illustrating an example of order information that is used in a manufacturing line illustrated in FIG. 1.

FIG. 3 is a schematic diagram illustrating an example of the hardware configuration of the relay server device 200 that is used in the management system 1 according to the embodiment.

Referring to FIG. 3, the relay server device 200 includes a processor 202 that executes various programs including an operating system (OS) 212 and a processing program 214; a memory 204 that provides a work area for storing data necessary for program execution in the processor 202, and a hard disk drive (HDD) 210 that stores, for example, a program that is executed by the processor 202 in a nonvolatile manner.

The relay server device 200 includes an optical drive 216, reads a stored program from an optical recording medium 218 (for example, a digital versatile disc (DVD)) that non-transitoryly stores a computer-readable program, and installs the program on a hard disk drive 210 or the like.

The relay server device 200 further includes an input unit 220 that receives an operation from the user, and an output unit 222 that outputs processing results or the like to the user or the like. The input unit 220 typically includes a keyboard, a mouse, a touch panel, and the like, and the output unit 222 typically includes a display, various indicators, a printer, and the like.

The relay server device 200 further includes a global communication interface 206 for exchanging data with the collection and analysis server device 250 or the like, and a local communication interface 208 for performing communication via the local network 116. For these interfaces, hardware according to a network that is a target is adopted.

The respective components described above are interconnected via an internal bus 224. In a typical implementation, since the relay server device 200 can be realized using hardware according to a general-purpose architecture, no further detailed description will be given herein.

The function of the relay server device 200 may be replaced with the PLC or may be implemented as a dedicated device using an application specific integrated circuit (ASIC) or the like.

<D. Hardware Configuration Example of Collection and Analysis Server Device 250>

As an example of a hardware configuration of the collection and analysis server device 250, the collection and analysis server device 250 may be configured of a general-purpose computer, similar to the example of the hardware configuration (see FIG. 3) of the relay server device 200 described above. Since a concrete example of the hardware configuration has been described above, detailed description thereof will not be repeated herein.

<E. Overview of Entity Management Process>

The management system 1 according to the embodiment realizes production management for each workpiece with relatively little remodeling for the manufacturing line 100 on which production management is performed in units called "orders" in which a predetermined number of the same type of workpieces are grouped. Terms similar to "order" include "lot," but the term "order" is used in this specification. Such production management for each workpiece is also referred to as "entity management" below.

The order information includes a designation of the type of manufacturing target and a designation of the number of manufacture targets. FIG. 4 is a schematic diagram illustrating an example of order information 400 that is used in the manufacturing line 100 illustrated in FIG. 1. Referring to FIG. 4, in the order information, instructions relating to manufacturing are defined for each order. For convenience of description, FIG. 4 illustrates an example in which a plurality of instructions of orders are included in one piece of order information 400, but order information 400 may be generated for each order.

Specifically, the order information 400 includes an order number field 402, a product type code field 404, an option code field 406, and a quantity field 408. Values stored in the product type code field 404 and the option code field 406 correspond to information for designating a type of manufacturing target, and a value stored in the quantity field 408 corresponds to information for designating the number of manufacturing targets.

Identification information for specifying each order is stored in the order number field 402. Information for specifying a product to be manufactured is stored in the product type code field 404. Information (for example, information such as urgent manufacturing) that is designated in addition to the information stored in the product type code field 404 is stored in the option code field 406. The number of products to be manufactured for each order is stored in the quantity field 408.

The order information 400 as illustrated in FIG. 4 is given from a production management server device (not illustrated) or the like to the PLCs 111 to 115 (see FIG. 1) that control the respective facilities constituting the manufacturing line 100 (or controllers that control the respective facilities separately from the PLCs).

Each of the PLCs controls a facility that is a control target according to the given order information 400. Thus, one or a plurality of facilities constituting the manufacturing line 100 are configured to process individual workpieces according to the order information 400.

Figure 5:
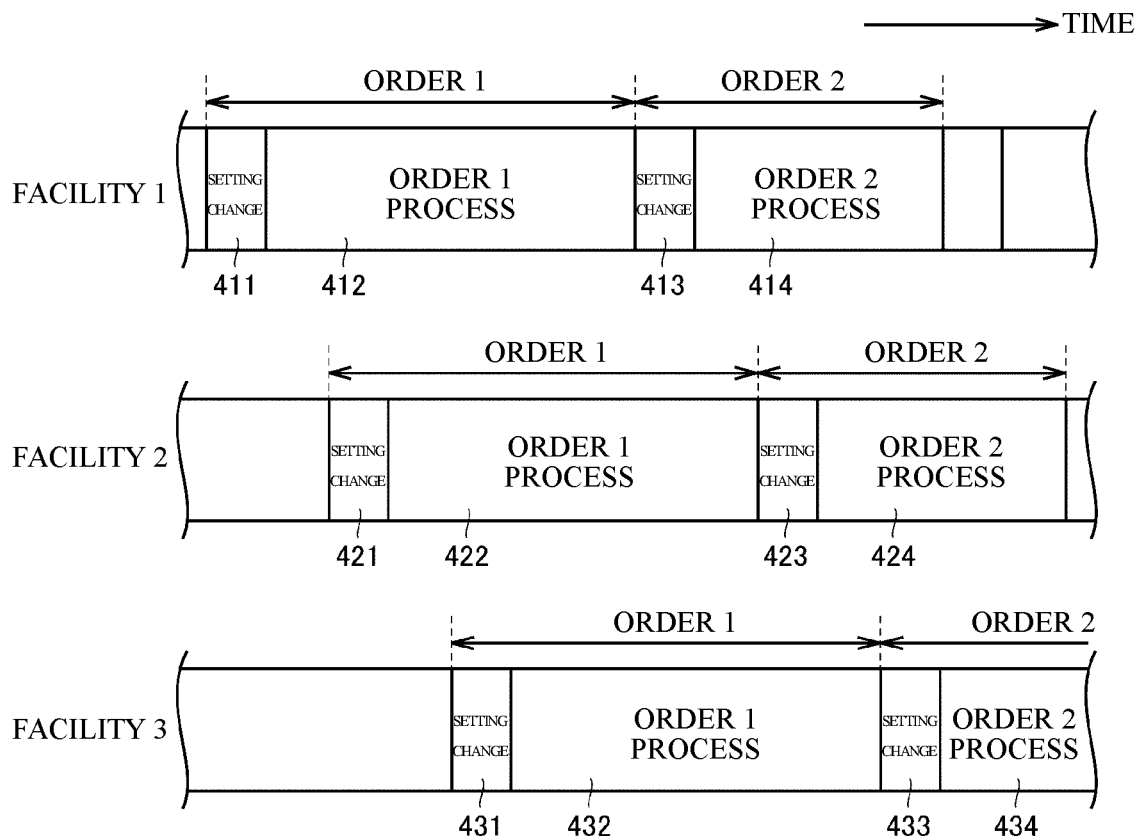
FIG. 5 is a schematic diagram illustrating a process in each facility of the manufacturing line illustrated in FIG. 1.

FIG. 5 is a schematic diagram illustrating a process in each facility of the manufacturing line 100 illustrated in FIG. 1. Referring to FIG. 5, workpieces sequentially flow from the upstream side of the manufacturing line 100, and the process designated by each facility is executed. FIG. 5 illustrates an example in which two orders (order 1 and order 2) are sequentially processed.

As illustrated in FIG. 5, order information for performing the processes according to order 1 and order 2 is given to facilities 1 to 3. Each of facility 1 to facility 3 performs the designated process after performing a setting change according to the given order information.

For facility 1, a setting change 411 directed to order 1 is executed, and then a process 412 of order 1 is executed. Subsequently, a setting change 413 directed to order 2 is executed, and then a process 414 of order 2 is executed. A certain interval is provided between order 1 and order 2.

Similarly, for facility 2, a setting change 421 directed to order 1 is executed, and then a process 422 of order 1 is executed. Subsequently, a setting change 423 directed to order 2 is executed, and then a process 424 of order 2 is executed. Similarly, for facility 3, a setting change 431 directed to order 1 is executed, and then a process 432 of order 1 is executed. Subsequently, after a setting change 433 directed to order 2 is executed, a process 434 of order 2 is executed.

As illustrated in FIG. 5, a timing at which a series of processes are performed according to the same order in each facility differs according to processing capacities of the manufacturing line 100 and the facilities.

The production management server device that generates the order information in the manufacturing line 100 collects and manages information such as the process start and processing completion of each order in each facility, but does not collect and manage information in units of workpieces included in each order.

Figure 6:
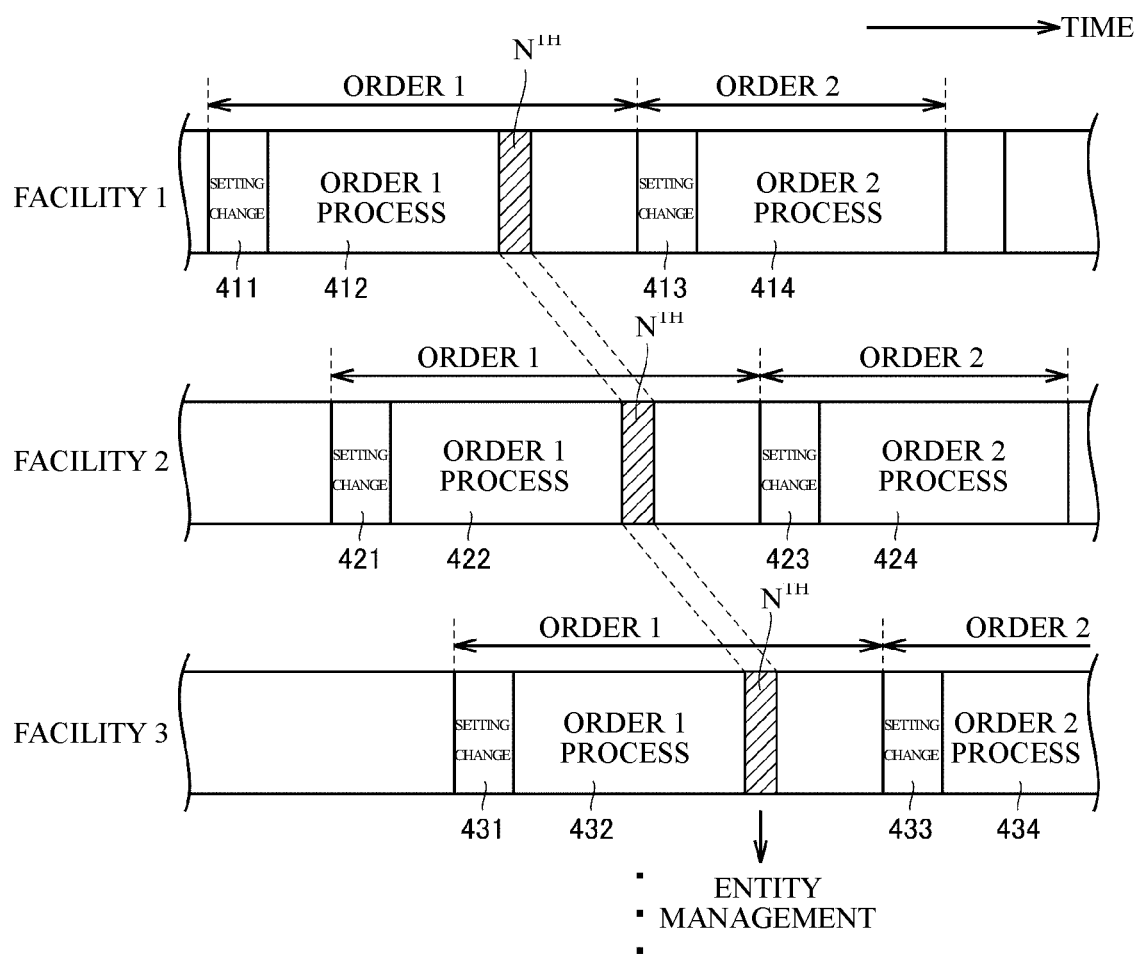
FIG. 6 is a schematic diagram illustrating an entity management process that is provided by the management system according to the embodiment.

On the other hand, the management system 1 according to the embodiment enables entity management for each workpiece included in each order even in the manufacturing line 100 for order management as illustrated in FIG. 5. FIG. 6 is a schematic diagram illustrating an entity management process that is provided by the management system 1 according to the embodiment.

Referring to FIG. 6, for example, by selectively extracting information on an $N^{th}$ workpiece among a plurality of workpieces included in order 1, it is possible to easily recognize and analyze how the $N^{th}$ workpiece has been manufactured through a plurality of facilities 1 to 3. Thus, even when the production management server device manages manufacturing only in units of orders, it is possible to manage manufacturing in units of workpieces included in each order by adopting the management system 1 according to the embodiment.

Figure 7:
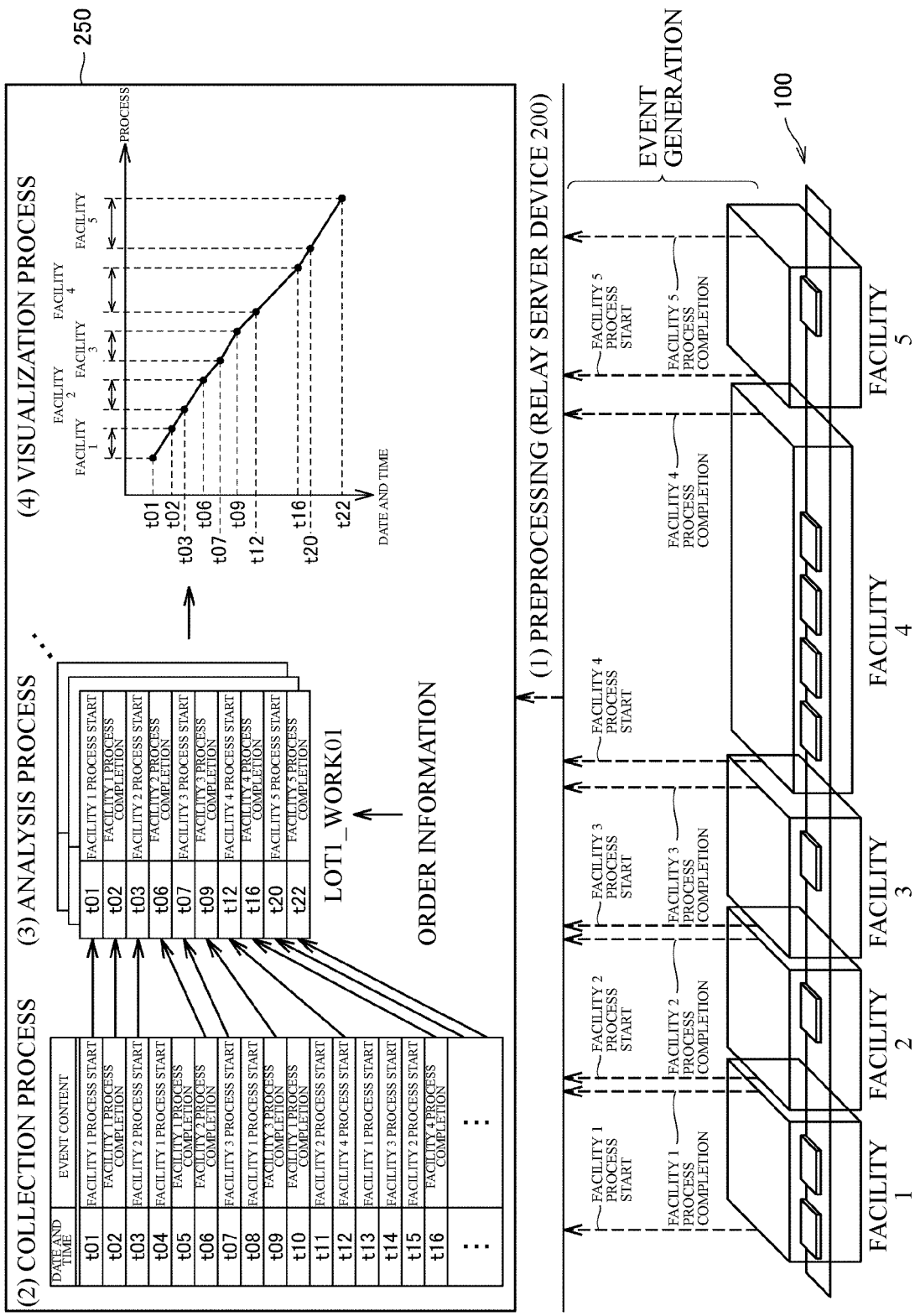
FIG. 7 is a schematic diagram illustrating an overview of the entity management process in the management system according to the embodiment.

FIG. 7 is a schematic diagram illustrating an overview of the entity management process in the management system 1 according to the embodiment. Referring to FIG. 7, each of facilities 1 to 5 constituting the manufacturing line 100 performs a notification of event information on a workpiece. In the embodiment, the "event information" includes at least one of information indicating a progress status of a process for an arbitrary workpiece (entity) included in an arbitrary order, and information through which the progress of the process can be inferred.

Specifically, the event information includes, for example, information indicating that a target facility has started processing for a certain workpiece, that the target facility has completed processing for a certain workpiece, that a certain workpiece has arrived for processing, and that a workpiece has been discharged. The event information is notified of by, for example, a control device (typically a PLC) that controls each facility and a device unique to each facility.

The relay server device 200 performs a process ((1) preprocessing) of adding date and time, identification information, and the like to the event information notified from each facility, and transmits the resultant event information to the collection and analysis server device 250 (see also FIG. 1).

The collection and analysis server device 250 performs (2) a collection process, (3) an analysis process, and (4) a visualization process on the event information from each facility. In the terminal device 300, an analysis result subjected to the visualization process is displayed ((5) display process). The entity management is realized by such a series of processes (see also FIG. 1). An overview of these processes will be described below.

In (2) the collection process, the collection and analysis server device 250 collects event information regarding a process generated in one or a plurality of facilities. In this case, each piece of event information is directly or indirectly associated with date and time information indicating date and time of occurrence, and identification information indicating a facility in which event information has occurred.

In (3) the analysis process, the collection and analysis server device 250 analyzes the collected event information and extracts event information caused by the same workpiece included in an arbitrary order. In this case, by referring to the order information, it is possible to specify, for example, the order number to which the workpiece from which the event information has been extracted belongs.

In the example illustrated in FIG. 7, an example in which process start and completion date and time in each of the facilities 1 to 5 for a first workpiece (work 01) included in order number 1 is extracted is shown.

In (4) the visualization process, the collection and analysis server device 250 visually reproduces, for example, a progress record of a process for a specific workpiece on the basis of the event information extracted by (3) the analysis process. In the example illustrated in FIG. 7, an example in which a two-dimensional graph in which the progress status of the process (each facility) in the manufacturing line 100 is plotted on a horizontal axis and date and time when the process in each process is started and completed is plotted on a vertical axis is output as the analysis result is shown. Such an analysis result may be provided to the terminal device 300 (see FIG. 1) or the like.

Through the above process, the entity management for each workpiece included in each order can be realized even on a manufacturing line in which production management is performed in units of order.

<F. Details of Entity Management Process>

Next, each process for realizing the entity management illustrated in FIG. 7 will be described in detail.

(f1: (1) Preprocessing)

As preprocessing, the relay server device 200 unifies a format of the event information received from each facility (a PLC or a device specific to each facility).

Figure 8:
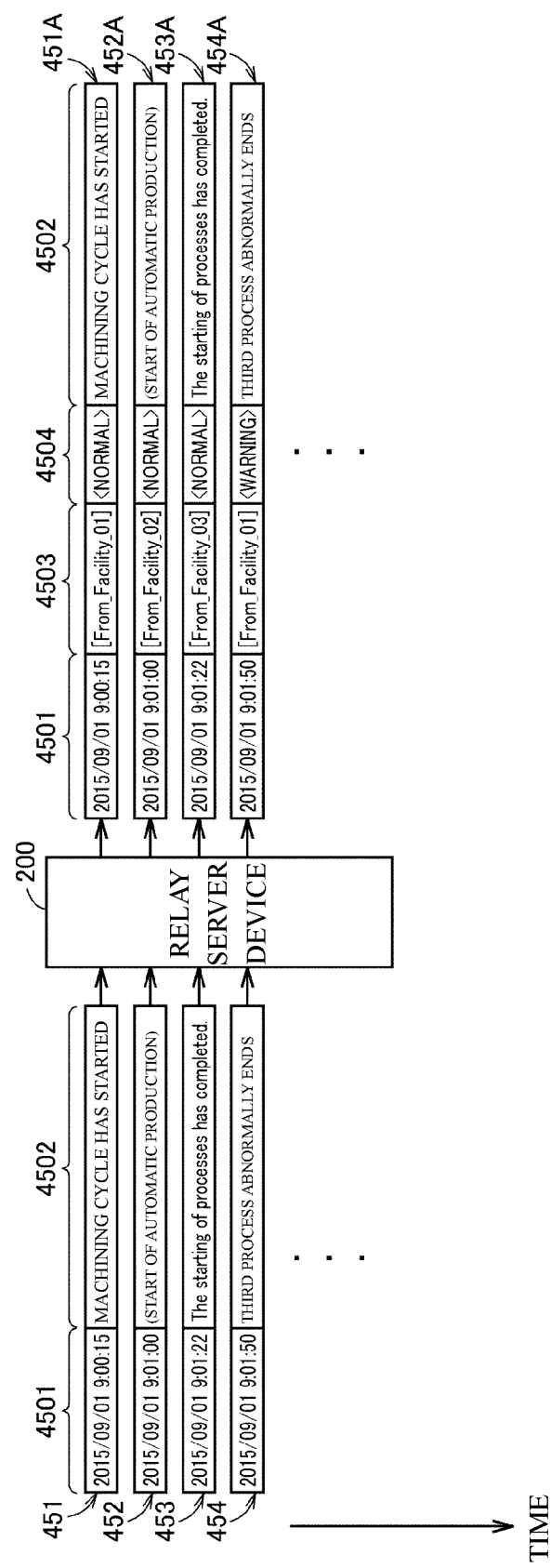
FIG. 8 is a schematic diagram illustrating preprocessing for realizing the entity management process in the management system according to the embodiment.

FIG. 8 is a schematic diagram illustrating preprocessing for realizing the entity management process in the management system 1 according to the embodiment.

Referring to FIG. 8, it is assumed that event information 451, 452, 453, 454, . . . are notified of in a plurality of respective facilities. Each of the event information 451, 452, 453, 454, . . . includes a date and time field 4501 and an event content field 4502. Such event information is input to the relay server device 200 each time an event occurs in any of the facilities.

The relay server device 200 specifies the facility that has generated the event information with respect to the input event information, and adds identification information indicating the facility to the event information. More specifically, the relay server device 200 specifies the facility that has generated the event from, for example, header information (more specifically, a transmission source address or the like) included in a packet in which the event information is stored.

Further, the relay server device 200 determines the type of input event information on the basis of, for example, a character string stored in the event content field 4502, and adds the determined type to the event information. As a type to be added, "NORMAL" meaning normal is added when the event is a general event, and "WARNING" meaning a warning is added when the event is an event caused by any abnormality.

Such information is added to the event information 451, 452, 453, 454, . . . and the resultant event information is transmitted to the collection and analysis server device 250 as the event information 451A, 452A, 453A, 454A, . . . . In the event information 451A, 452A, 453A, 454A, . . . , the identification information indicating the facility is stored in the transmission source field 4503, and the information indicating the type is stored in the type information field 4504.

In the relay server device 200, the above-described process is performed as preprocessing.

Another information may be added in addition to the information as described above, or in place of the information as described above. That is, information necessary and sufficient to efficiently perform the collection process and the analysis process in the collection and analysis server device 250 may be added. Examples of the information that may be added to the event information may include unique identification information of the device that has generated each piece of event information, a number imparted as a serial number to the same type of event information, and an elapsed time after the same type of event information is generated most recently.

For convenience of description, FIG. 8 illustrates a configuration example in which relatively simple content is stored in the event content field 4502, but detailed information on a processing result in each facility or the like may be included. In the example illustrated in FIG. 8, a configuration in which the necessary information is added as the header information is exemplified, but the present invention is not limited thereto. For example, meta information or the like may be used.

Further, FIG. 8 illustrates an example in which date and time are imparted to each of the event information 451, 452, 453, 454, . . . in advance, but in order to realize this configuration, each facility or a PLC that controls each facility must hold a timer. In order to simplify the device configuration, when the configuration is such that a propagation delay between each facility and the relay server device 200 can be ignored, the relay server device 200 can add date and time information to the event information according to a timing at which the relay server device 200 receives the event information. By adopting such a configuration, it is not necessary to keep a timer synchronized between the facilities.

Transmission of the event information 451A, 452A, 453A, 454A, . . . from the relay server device 200 to the collection and analysis server device 250 may be performed at an arbitrary timing. For example, a real-time process (a method of performing pre-processing immediately upon reception of event information and transmitting event information to the collection and analysis server device 250 immediately after execution of pre-processing), a sequential process (a method of performing preprocessing immediately before event information is received, and transmitting the event information to the collection and analysis server device 250 when the event information after the preprocessing reaches a predetermined number), a batch process (a method of collecting event information from each facility in each processing period, collectively executing preprocessing on the collected event information, and transmitting a result thereof to the collection and analysis server device 250), or the like can be adopted. Further, the processes may be performed at different timings.

(f2: (2) Collection Process and (3) Analysis Process)

Next, (2) a collection process and (3) an analysis process performed by the collection and analysis server device 250 will be described. For the sake of convenience, two processes, that is, the collection process and the analysis process will be described separately, but it is not necessary to clearly distinguish both processes, which can be implemented as appropriate according to a situation.

Figure 9:
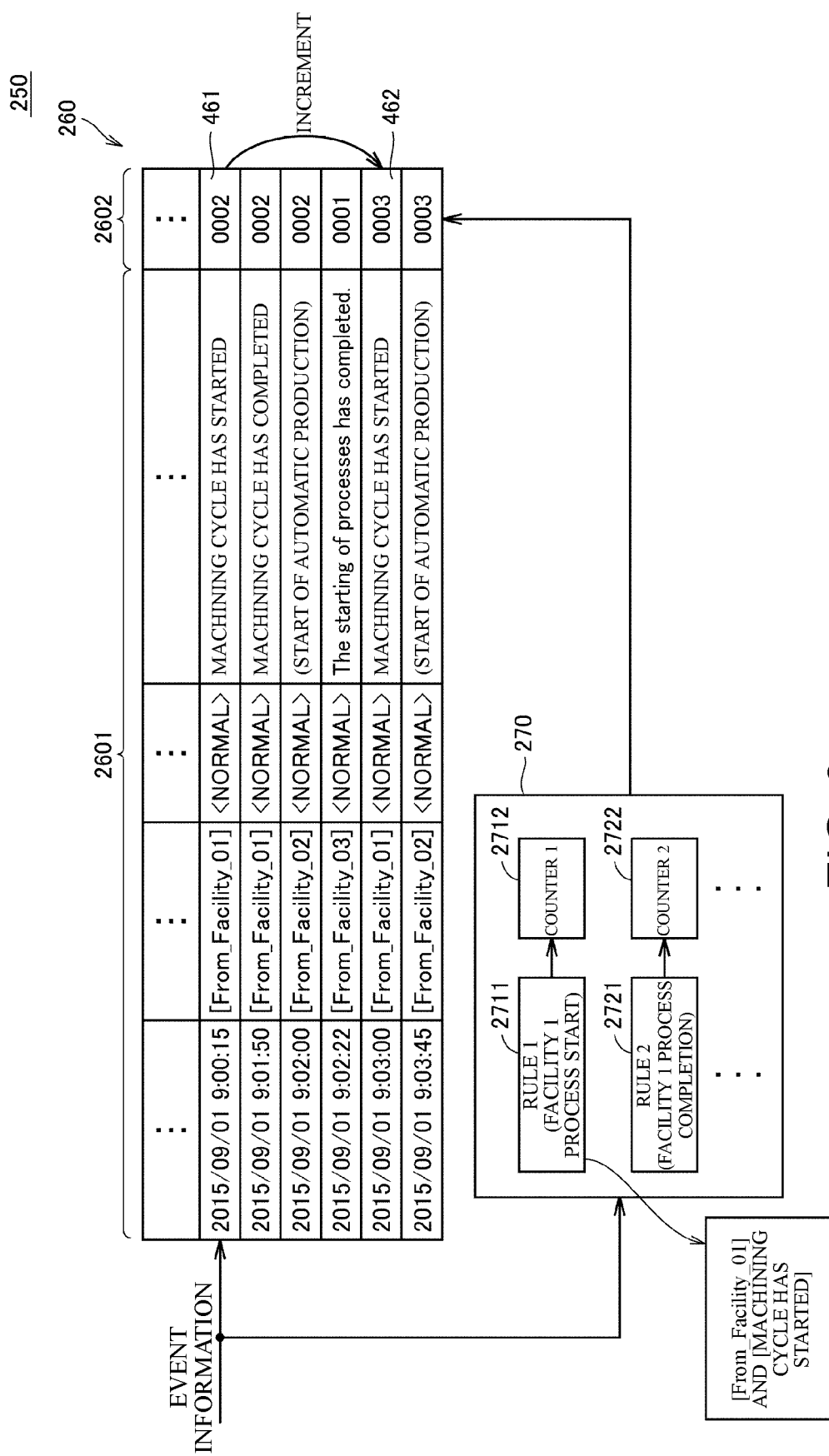
FIG. 9 is a schematic diagram illustrating a collection process and an analysis process for realizing the entity management process in the management system according to the embodiment.

FIG. 9 is a schematic diagram illustrating a collection process and an analysis process for realizing the entity management process in the management system 1 according to the embodiment. Referring to FIG. 9, the collection and analysis server device 250 includes an event information storage unit 260 for collecting event information regarding a process occurring at one or a plurality of facilities. In the event information storage unit 260, the event information transmitted from the relay server device 200 is sequentially stored, and workpiece identification information for specifying a workpiece causing each piece of event information is associated with each piece of event information. The event information storage unit 260 includes an event information field 2601 for storing event information and a workpiece identification information field 2602 for storing workpiece identification information. For simplicity of description, a simplified table structure is illustrated in FIG. 9, but an actual implementation form is not limited thereto, and an arbitrary data structure may be adopted.

The collection and analysis server device 250 further includes a workpiece identification module 270. The workpiece identification module 270 executes a process of classifying the collected event information into a set of event information caused by the same workpiece on the basis of a generation source and content of each piece of event information. That is, the workpiece identification module 270 determines workpiece identification information for specifying which workpiece causes each piece of event information. Specifically, the workpiece identification module 270 includes a plurality of rules 2711, 2721, . . . and corresponding counters 2712, 2722, . . . .

The plurality of rules 2711, 2721, . . . are rules for determining which facility the input event information has occurred from, and define characteristics unique to each facility included in the event information. When the event information 451A, 452A, 453A, 454A, . . . as illustrated in FIG. 8 is input, the respective identification information stored in the transmission source field 4503 and the content stored in the event content field 4502 are designated. For example, the rule 2711 illustrated in FIG. 9 is a rule for detecting the event information of a process start of facility 1. For example, a condition that the transmission source field 4503 includes "[From Facility_01]", and the event content field 4502 includes "a machining cycle has started" is defined.

When the input event information matches any one of the rules, the corresponding counter is incremented, and the incremented count value is associated with the input event information. For example, "0002" is associated as workpiece identification information with the event information 461 (event information indicating the process start of facility 1) stored in a first column in the event information storage unit 260 of FIG. 9, and then, when event information 462 (which is event information indicating the process start of facility 1, similar to the event information 461) is input, it can be determined that the input event information 462 is caused by another workpiece subsequent to the workpiece causing the event information 461. Therefore, the workpiece identification information "0003" is associated with the event information 462, unlike the workpiece with which the workpiece identification information "0002" has been associated. Thus, when the collection and analysis server device 250 (workpiece identification module 270) receives event information having the same content from the same generation source a plurality of times, the collection and analysis server device 250 classifies the event information into event information caused by different workpieces.

A process of imparting the workpiece identification information as described above is performed, and it is specified which workpiece generates a plurality of types of event information having different generation time. Thus, the collection and analysis server device 250 (the workpiece identification module 270) classifies collected event information by preparing a plurality of rules 2711, 2721, . . . according to the configuration in the manufacturing line 100 of one or a plurality of facilities in advance and applying the rules.

For convenience of description, the configuration in which the workpiece identification information is incremented for each rule is exemplified in FIG. 9, but the present invention is not limited to such incrementing scheme, and any scheme may be adopted as the workpiece identification information as long as the scheme is a method capable of identifying a plurality of workpieces and specifying a series of event information generated by the same workpiece.

The process of imparting the above-described workpiece identification information may be performed sequentially or in a batchwise manner. For example, the process may be executed each time event information is received, or the process may be started on condition that a predetermined number of event information has been accumulated.

FIG. 10 is a schematic diagram illustrating a part of the analysis process for realizing the entity management process in the management system 1 according to the embodiment. The collection and analysis server device 250 generates data indicating the process status of each workpiece on the basis of the event information belonging to each of the groups of classified event information.

More specifically, the collection and analysis server device 250 groups the information stored in the event information storage unit 260 illustrated in FIG. 9 using the workpiece identification information stored in the workpiece identification information field 2602 as a key. Then, as an example of data indicating the process status of each workpiece as illustrated in FIG. 10, an event information set 280 for each piece of workpiece identification information is generated. That is, the collection and analysis server device 250 generates a set of event information with which the same workpiece identification information has been associated. It is possible to specify, for example, a progress record of the process of each workpiece by generating the event information set 280 as illustrated in FIG. 10 for each piece of workpiece identification information.

A state in which event information sets 280 are grouped is illustrated in FIG. 10, but an arbitrary scheme can be adopted as an actual implementation form. For example, event information associated with each other may be implicitly designated using some identification information imparted to the event information.

FIG. 11 is a schematic diagram illustrating a process for the event information set 280 for each piece of workpiece identification information illustrated in FIG. 10. For example, a tracking database 290 as illustrated in FIG. 11 can be generated by developing the event information set 280. Date and time of process start and process completion in each of a plurality of facilities installed in the manufacturing line 100 for each workpiece is stored in the tracking database 290.

Although, for convenience of description, an example of a simplified table structure is illustrated as the tracking database 290 in FIGS. 10 and 11, an arbitrary data structure can be adopted as a real implementation form.

The collection and analysis server device 250 specifies the order number to which the classified set belongs and the workpiece number within the order on the basis of the information on the time included in the order information 400. More specifically, the collection and analysis server device 250 compares the tracking database 290 with the order information 400 to specify an order number to which each workpiece of the tracking database 290 belongs, and which of workpieces of the order number each workpiece is. As illustrated in FIG. 11, for example, the order information 400 may include a start time and a completion time of each order as record values, in addition to the content of each order. The start time and the completion time are input to the production management server device automatically or manually.

More specifically, the collection and analysis server device 250 compares the process start time of facility 1 for any workpiece included in the event information set 280 with the start time included in the order information 400 to specify a workpiece for which a process in facility 1 has started after a process for a certain order has started ((1) comparison and (2) order number determination in FIG. 11). In the example illustrated in FIG. 11, since the process in facility 1 for the workpiece to which workpiece identification number "0002" has been imparted is started immediately after the process for order number "A0001" is started, a workpiece with workpiece identification number "0002" is specified as a first workpiece with the order number "A0001". The collection and analysis server device 250 associates the specified order number "A0001" with the target workpiece and imparts a workpiece number in an order from the first workpiece ((3) the first workpiece determination and (4) the workpiece number impartment in FIG. 11). This impartment of the workpiece number is continuously performed until the number ("50" in the example illustrated in FIG. 11) indicated for the corresponding workpiece number is reached by referring to the order information 400.

Through the series of processes as described above, it is possible to realize the management system 1 that can realize finer production management at a manufacturing site at which the production management is performed in units of order.

(f3: (4) Visualization Process)

Next, a process of visualizing, for example, information indicating a progress status of a process for an arbitrary workpiece (entity) included in an arbitrary order using, for example, the event information set 280 illustrated in FIG. 10 and the tracking database 290 illustrated in FIG. 11 will be described.

Figure 12:
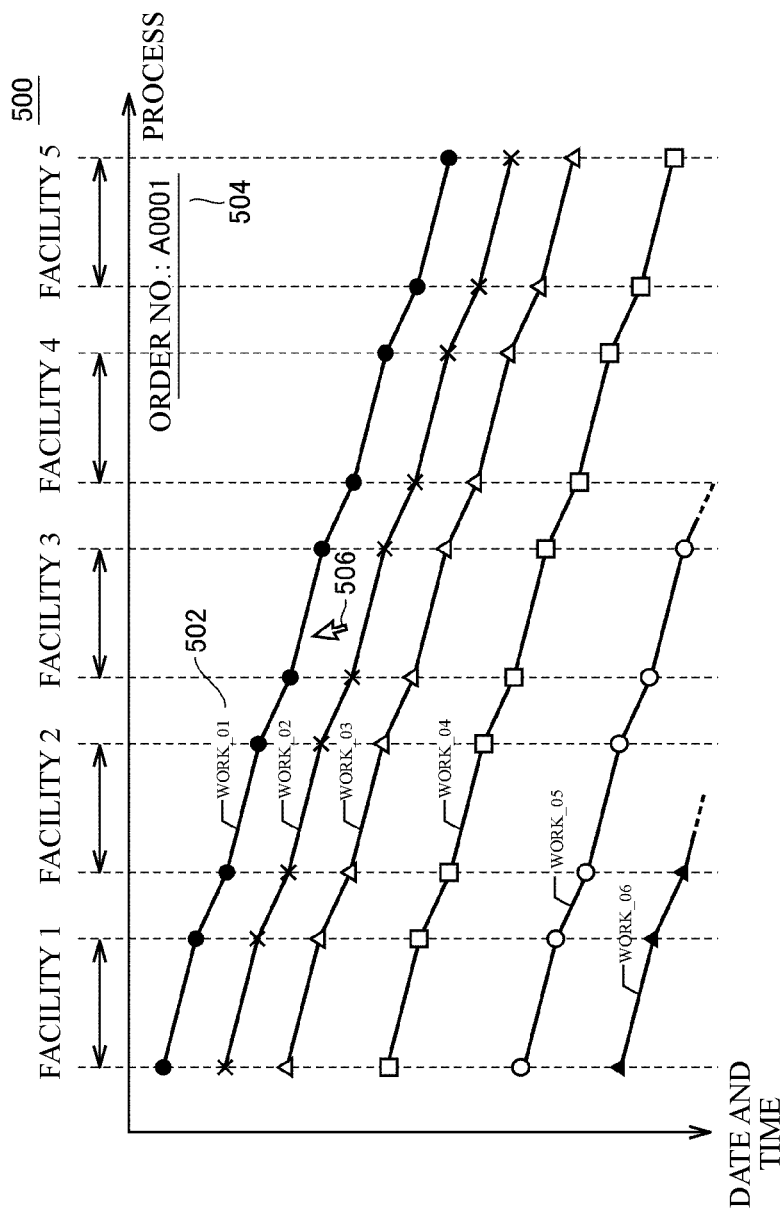
FIG. 12 is a schematic diagram illustrating an example in which an analysis result that is provided by the management system according to the embodiment is visualized.

FIG. 12 is a schematic diagram illustrating an example in which an analysis result that is provided by the management system 1 according to the embodiment is visualized. The collection and analysis server device 250 visualizes the progress status of the process for each workpiece that is processed according to the order information 400 on the basis of the generated tracking database 290.

For example, the collection and analysis server device 250 provides a time chart 500 as illustrated in FIG. 12 to the terminal device 300 (see FIG. 1). In the time chart 500, the progress status of the process (each facility) in the manufacturing line 100 is set on a horizontal axis, and a date and time (or time) at which the process in each process has been started and completed are set on a vertical axis. That is, the collection and analysis server device 250 reproduces a processing progress of each workpiece on the manufacturing line 100 on a plane that is defined by the axis associated with the process and the axis of time. By referring to the time chart 500 as described above, an administrator or the like of the manufacturing line 100 can recognize the progress status of the manufacturing based on the order in the manufacturing line 100 in more detail, and can easily specify a problematic part (that is, a bottleneck) in the manufacturing line 100.

In the time chart 500 illustrated in FIG. 12, a workpiece number 502 of each displayed workpiece and an order number 504 to which each workpiece belongs may be displayed together. The time chart 500 illustrated in FIG. 12 may be displayed in real time. That is, each time event information is notified from any of the facilities, the collection process and the analysis process as illustrated in FIGS. 8 to 11 may be executed to update the display content of the time chart 500 each time. By realizing such real-time display, it is possible to easily recognize a current status of the manufacturing line 100.

FIG. 13 is a diagram illustrating an example of log information that is developed and displayed from the time chart 500 illustrated in FIG. 12. When the time chart of any workpiece is selected by operating a cursor 506 in FIG. 12, the event information associated with the selected workpiece may be displayed as a list, as illustrated in FIG. 13. The list display illustrated in FIG. 13 is provided by extracting the event information set corresponding to the selected workpiece from the plurality of pieces of event information sets 280 illustrated in FIG. 10. That is, the collection and analysis server device 250 displays a list of event information classified into a set corresponding to the selected workpiece.

The present invention is not limited to the visualization examples illustrated in FIGS. 12 and 13, but any display aspect for presenting information obtained by the collection process and the analysis process to a user such as an administrator can be adopted.

(f4: Interpolation Process)

In the above description, the configuration in which each of the plurality of facilities installed in the manufacturing line 100 sends a notification of the event information of the start of the process and the completion of the process has been exemplified. However, as a matter of reality, all facilities can not always notify event information of the start of the process and the completion of the process. In such a case, the information included in the generated tracking database 290 may be used to interpolate (or estimate), for example, a time when missing event information would have occurred.

FIG. 14 is a schematic diagram illustrating an interpolation process for realizing the entity management process in the management system 1 according to the embodiment. In FIG. 14, as an example, the tracking database 290A that is generated when processing completion of facility 2 is not notified as the event information is illustrated.

For example, since the completion of the process of facility 2 is performed after the start of the process of facility 2 and before the start of the process of facility 3, a process completion time of facility 2 may be interpolated or estimated from a process start time of facility 2 and a process start time of facility 3 in the tracking database 290A. In this case, it is preferable to interpolate the processing completion time of facility 2 by referring to information such as a positional relationship between facility 2 and facility 3 in the manufacturing line 100, and a conveyance speed of the conveyor 110.

(f5: Use of Related Information)

In order to recognize a situation in the process (each facility) in the manufacturing line 100 in more detail, related information corresponding to a process progress of each workpiece may be associated using the tracking database 290 illustrated in FIG. 11 (or the time chart 500 illustrated in FIG. 12).

Figure 15:
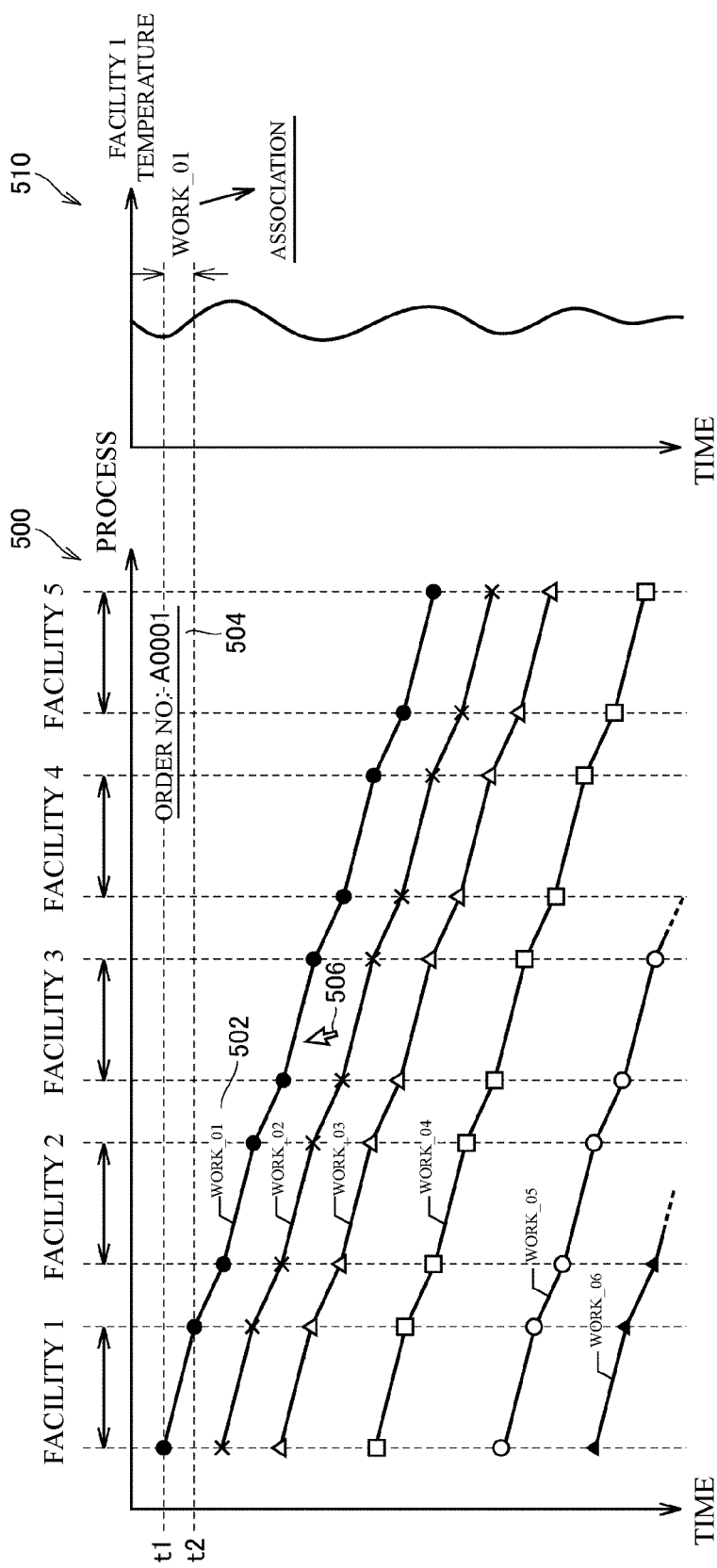
FIG. 15 is a schematic diagram illustrating a process of using related information in the management system according to the embodiment.

FIG. 15 is a schematic diagram illustrating the process of using the related information in the management system 1 according to the embodiment. Referring to FIG. 15, for example, the time chart 500 illustrated in FIG. 12 and a temperature record chart 510 of facility 1 are arranged on the same time axis. According to the time chart 500, it can be seen that the workpiece of which workpiece number is "01" exists in facility 1 between time t1 and time t 2. Therefore, in the temperature record chart 510, temperature record of a section from time t1 to time t2 may be stored in association with the workpiece. By associating such various types of corresponding information, it is possible to perform production management for each workpiece in more detail.

Further, in the interpolation process illustrated in FIG. 14 described above, for example, an arrival time of the workpiece to a predetermined facility may be estimated using a speed record in a corresponding section in a speed record of the conveyor 110 that conveys the workpiece.

(f6: Process Procedure)

Figure 16:
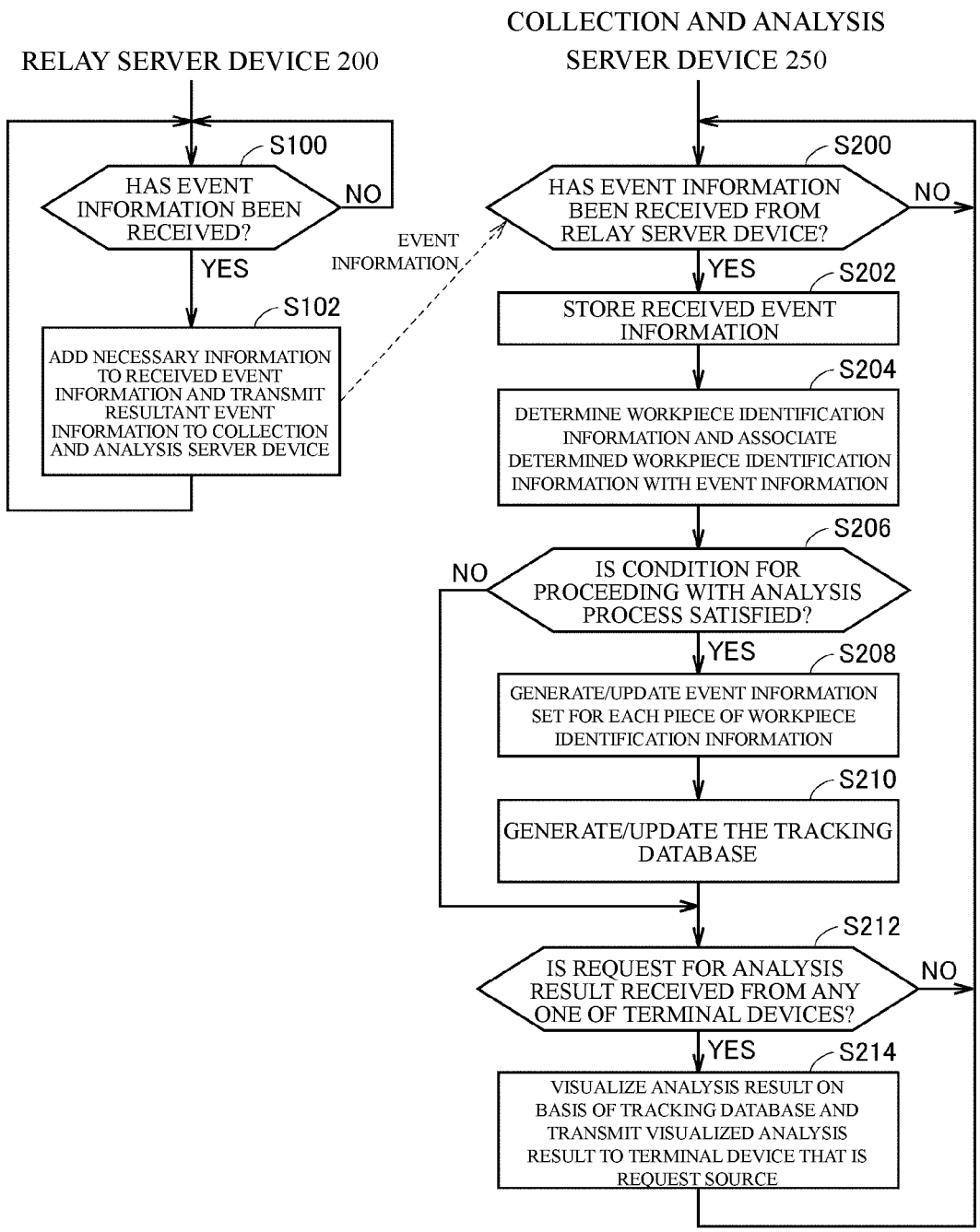
FIG. 16 is a flowchart illustrating a process procedure according to an entity management process in the management system according to the embodiment.

Next, a process procedure for realizing the entity management process described above will be described. FIG. 16 is a flowchart illustrating a process procedure according to entity management process in the management system 1 according to the embodiment. Each step illustrated in FIG. 16 is typically realized by the processor executing a processing program in each of the relay server device 200 and the collection and analysis server device 250.

Referring to FIG. 16, the relay server device 200 determines whether or not event information has been received from a PLC controlling any facility, or a device specific to any facility (step S100). When any event information has not been received (NO in step S100), step S100 and a subsequent process are repeated.

On the other hand, when any event information has been received (YES in step S100), the relay server device 200 adds necessary information to the received event information and transmits the resultant event information to the collection and analysis server device 250 (step S102). That is, the relay server device 200 performs preprocessing on the received event information. Step S100 and a subsequent process are repeated.

The collection and analysis server device 250 determines whether or not the event information has been received from the relay server device 200 (step S200). When any event information has not been received (NO in step S200), step S200 and a subsequent process are repeated.

On the other hand, when any event infatuation has been received (YES in step S200), the collection and analysis server device 250 stores the received event information (step S202), determines the workpiece identification information on the basis of a generation source of the stored event information and content thereof and associates the determined workpiece identification information with the event information (step S204).

Subsequently, the collection and analysis server device 250 determines whether or not a condition for proceeding with the analysis process is satisfied (step S206). When the analysis process is executed each time the event information is received, a condition such as whether or not new event information has been received can be used as a condition for proceeding with the analysis process. Alternatively, in a case in which a predetermined number of pieces of event information are collected and then the analysis process proceeds, a condition of whether or not a predetermined number of unprocessed event information has been collected can be used as the condition for proceeding with the analysis process. That is, it is possible to adjust an execution frequency of the analysis process by appropriately setting the condition for proceeding with the analysis process.

When the condition for proceeding with the analysis process is not satisfied (NO in step S206), the process proceeds to step S212.

When the condition for proceeding with the analysis process is satisfied (YES in step S206), the collection and analysis server device 250 extracts the event information to which the same workpiece identification information has been imparted and generates or updates the event information set (FIG. 10) for each piece of workpiece identification information (step S208). The collection and analysis server device 250 develops the event information set 280 to generate or update the tracking database (see FIG. 11) (step S210).

Further, the collection and analysis server device 250 determines whether or not a request for an analysis result is received from any one of the terminal devices 300 (step S212). When the request for an analysis result has not been received from any one of the terminal devices 300 (NO in step S212), step S200 and a subsequent process are repeated.

When the request for an analysis result has been received from any one of the terminal devices 300 (YES in step S212), the collection and analysis server device 250 visualizes the analysis result on the basis of the tracking database generated in step S210 and transmits the visualized analysis result to the terminal device 300 that is a request source (step S214). The visualized analysis result provided in step S214 may be updated each time. Step S200 and a subsequent process are repeated.

<G. Field Information Collection Process>

In the above description, an entity management process based on the "event information" including at least one of the information indicating the progress status of the process for any workpiece (entity) included in an arbitrary order and information through which the progress of the process can be inferred has been described. In the management system 1 according to the embodiment, it is possible to collect information other than the event information from the PLC arranged in each facility or the device specific to each facility. Hereinafter, an aspect of collecting information (hereinafter also referred to as "field information") acquired or managed by the PLC or the device specific to each facility and using for various analysis processes will be described.

(g1: Configuration Example of PLC)

In the embodiment, the "field information" means a generic name of information directly or indirectly related to the process of the workpiece in each facility, and may include "event information". As the "field information", for example, a detection result (an input signal) of an arbitrary sensor arranged in each facility, an output instruction (an output signal) to an arbitrary actuator, a status of an arbitrary device, a history of a user operation, or the like is included. The management system 1 according to the embodiment collects field information that is acquired in one or a plurality of facilities.

Figure 17:
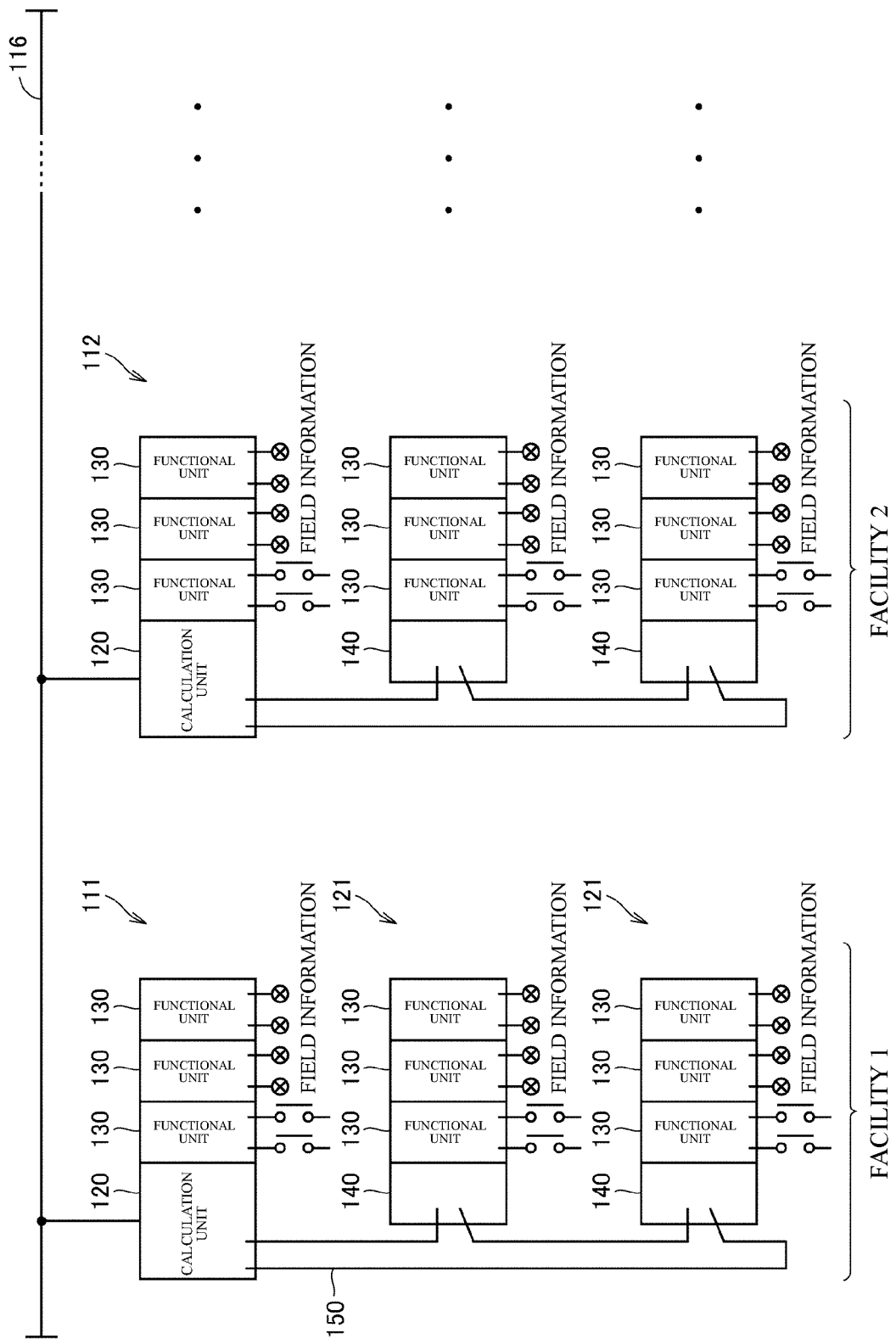
FIG. 17 is a schematic diagram illustrating an example of a hardware configuration of a PLC according to collection of field information that is used in the management system according to the embodiment.

FIG. 17 is a schematic diagram illustrating an example of a hardware configuration of the PLC according to collection of field information that is used in the management system 1 according to the embodiment. Referring to FIG. 17, for example, the PLC 111 that controls facility 1 includes one or a plurality of remote IO devices 121 that are connected via a field bus 150, in addition to one or a plurality of functional units 130 that are connected in parallel to the calculation unit 120. The remote IO device 121 includes a communication unit 140, and one or a plurality of functional units 130.

Each of the functional units 130 typically has a function such as a DI for receiving a digital signal or an AI for receiving an analog signal, and collects field information from the facility that is a control target. For example, a displacement sensor that measures a position and a height of the workpiece, and a photoelectric sensor that detects the arrival of the workpiece are connected to the functional unit 130. The field information collected by the functional unit 130 of the remote IO device 121 is periodically or eventually transmitted to the calculation unit 120 via the field bus 150.

In response to an instruction from the calculation unit 120, the remote IO device 121 can transmit model information of the connected functional unit 130 itself, model information of a sensor connected to the functional unit 130, a current set value of the sensor, self-diagnostic information or measurement data of the sensor (for example, the amount of light received by the photoelectric sensor), and a current set value (for example, a range width or a threshold value) of the functional unit 130 to the calculation unit 120.

For the PLC 112 that controls facility 2 and other PLCs (not illustrated), the same configuration may be adopted. However, it is not necessary to provide the remote IO device in all PLCs, and the remote IO device is arranged according to, for example, the number and type of field information that is a collection target.

The field information collected by the functional unit 130 connected to the PLC (a main body unit) and the functional unit 130 connected to the remote IO device is transmitted to the relay server device 200 (see FIG. 1) via the local network 116, similar to the event information described above. The field information may be periodically transmitted from the PLC to the relay server device 200 or may be transmitted to the relay server device 200 in response to an event from the relay server device 200.

Further, field information for a predetermined period may be temporarily stored in the PLC and then transmitted together at once, or may be transmitted each time the field information is collected. Alternatively, when the field information is transmitted as an event only the field information designated by the relay server device 200 may be selectively transmitted.

(g2: Data Collection Process)

The field information collected by the PLC or the device specific to each facility is collected by the collection and analysis server device 250 via the relay server device 200. Hereinafter, the data collection process in the collection and analysis server device 250 will be described.

The collection and analysis server device 250 sequentially stores each value of the field information in association with a collection time. FIG. 18 is a schematic diagram illustrating an example of the field information collected in the management system according to the embodiment. Referring to FIG. 18, for example, field information database 700 collected in the collection and analysis server device 250 sequentially stores each value 712 in association with a collection time, in addition to a tag name 710 imparted to each of the field information. A sampling period (a collection period) of the field information is not necessarily the same according to a type of field information, a type of sensor, performance of the PLC, or the like. Therefore, a period in which the field information cannot be collected may be present in the field information database 700. Even in such a case, various analysis processes to be described below can be executed. For a period in which the field information is missing, interpolation may be performed using field information before and after the period to form a series of field information.

The field information 701 (tag: 001-0001) stored in the field information database 700 corresponds to, for example, the detection result of the photoelectric sensor that detects the arrival of the workpiece or the like, indicates "ON" when the workpiece is detected, and indicates "OFF" in other situations.

The field information 702 and 703 (tags: 001-0002 and 001-0003) stored in the field information database 700 correspond to, for example, detection results of the displacement sensor that detects a size of a workpiece or the like, and the detection result (analog value) is output when the workpiece that is a detection target enters a detection field of view of the displacement sensor. The field information 704 (tags: 001-0004) stored in the field information database 700 correspond to, for example, detection results of the adsorption pressure sensor that detects adsorption pressure of a device that adsorbs a workpiece.

(g3: Association Process)

The collection and analysis server device 250 collects the field information database 700 as illustrated in FIG. 18 and executes the analysis process. As an example of this analysis process, the collection and analysis server device 250 executes a process of associating the collected field information with the corresponding workpiece.

FIG. 19 is a schematic diagram illustrating an example of an association process for field information in the management system according to the embodiment. Referring to FIG. 19, the collection and analysis server device 250 executes a process of associating field information included in the field information database 700 with a corresponding workpiece using a result of the entity management process that is executed first or in parallel. In the example illustrated in FIG. 19, it is assumed that each piece of field information included in the field information database 700 is field information from facility 1. By applying the process start and completion date and time for each facility for each workpiece as illustrated in FIG. 11 described above to such field information, it is possible to specify a range of one piece of field information or any of the plurality of pieces of field information arranged in time series which is caused by the specific workpiece, as illustrated in FIG. 19. In the example illustrated in FIG. 11, a process of associating field information after "2015/09/01 09:00:15" with the workpiece is executed on the basis of the result in the entity management process that the process in facility 1 for the workpiece with the workpiece identification number "0002" of the order number "A0001" has been started from "2015/09/01 09:00:15". For other workpieces and other facilities, field information associated with each workpiece is specified in the same procedure as illustrated in FIG. 19.

(g4: Display Process)

Through the above-described association process, a range of field information associated with each workpiece is specified. It is preferable to display this specified field information in a more user-friendly aspect.

Figure 20:
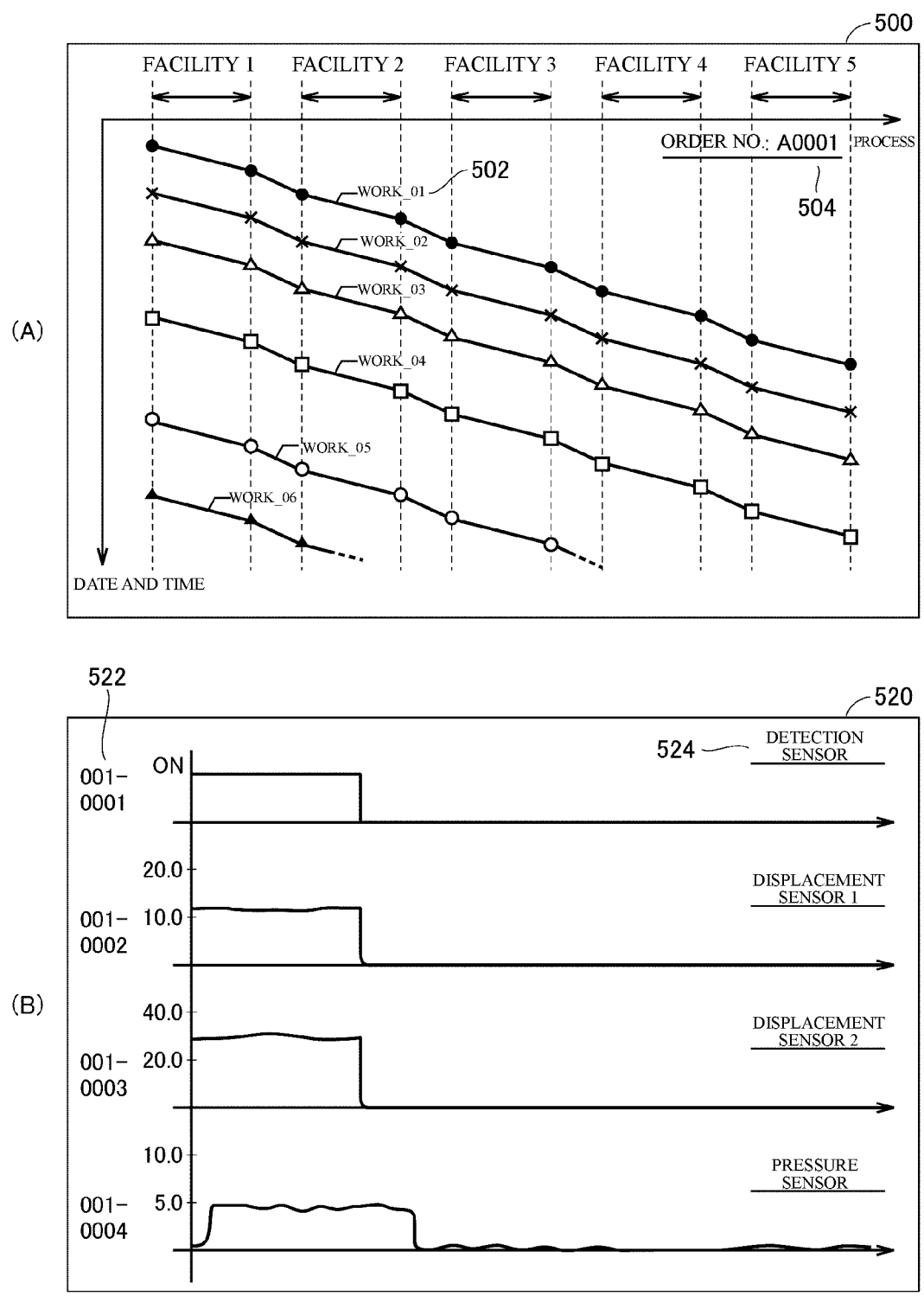
FIG. 20 is a schematic diagram illustrating an example of a process of displaying field information in the management system according to the embodiment.

FIG. 20 is a schematic diagram illustrating an example of a field information display process in the management system according to the embodiment. In part (A) of FIG. 20, an example of a time chart 500 in which a progress status of the process (each facility) in the manufacturing line 100 is set on a horizontal axis, and a date and time (or time) when the process in each process is started and completed is set on a vertical axis is illustrated. On the time chart 500 illustrated in part (A) of FIG. 20, when the user operates the cursor 506 to select a section showing a process at the target facility of any workpiece (in the example illustrated in part (A) of FIG. 20, a section in which "work_02" is processed in facility 1), the time chart 520 of the field information acquired in the selected section is displayed as illustrated in part (B) of FIG. 20. That is, in the visualization process, the collection and analysis server device 250 displays the associated field information in response to the selection of the workpiece.

In the time chart 520, one or a plurality of collected pieces of field information are displayed in a comparable aspect on a common time axis. The present invention is not limited to the aspect illustrated in part (B) of FIG. 20, and the plurality of pieces of field information may be overlapped and displayed.

In the time chart 520, a tag name 522 imparted to the field information to be displayed, and supplementary information 524 such as a preset sensor name may be displayed, in addition to a time waveform of the corresponding field information.

As illustrated in FIG. 20, by adopting associated switching between a macro behavior and a micro behavior of each workpiece, a manager of the manufacturing line 100, or the like can recognize the progress status of manufacturing based on the order in the manufacturing line 100 in more detail, and examine a problematic part (that is, a bottleneck) in the manufacturing line 100 in detail.

(g5: Trend Monitoring Process)

Through the above association process, a range of the field information associated with each workpiece is specified. As a result, it is possible to collect, for example, for each workpiece, a local change in field information occurring within a predetermined period from the start of the process for each workpiece. For example, it is possible to predict a deterioration trend of the facility by comparing, over a plurality of workpieces, field information collected from a device that operates only for a few seconds from the start of the process in a certain facility.

Figure 21:
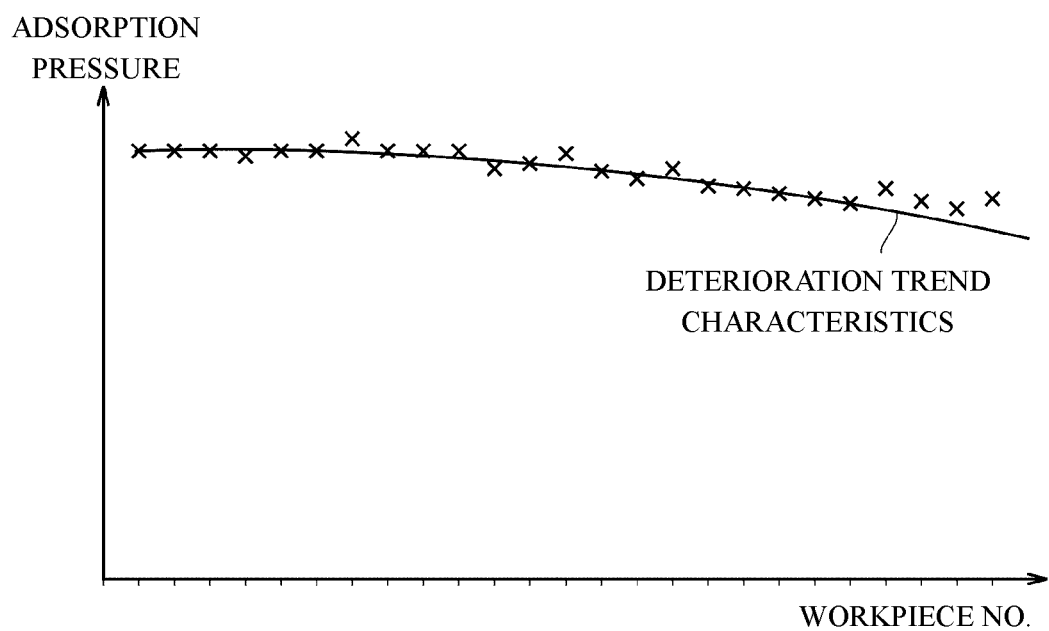
FIG. 21 is a schematic diagram illustrating an example of a trend monitoring process using field information in the management system according to the embodiment.

FIG. 21 is a schematic diagram illustrating an example of the trend monitoring process using the field information in the management system according to the embodiment. In FIG. 21, for example, adsorption pressure (average value during an operation) of a device that adsorbs a workpiece in a certain facility is displayed side by side in an order of the processed workpiece. That is, the workpiece number is set on a horizontal axis, and the adsorption pressure is set on a vertical axis.

It is possible to calculate deterioration trend characteristics for the adsorption pressure from a plot value of the adsorption pressure for each workpiece as illustrated in FIG. 21. It is possible to estimate, for example, the number of workpieces until a predetermined deterioration level (for example, a caution value or a damage value) is reached on the basis of the calculated deterioration trend characteristics. That is, it is possible to estimate, for example, the number of workpieces that can be processed until any maintenance work is required. The caution value indicates a level of a first stage in which a device or process corresponding to the acquired field information shows the deterioration trend. When this caution value is reached, this means that an immediate response is not necessarily required, but continuous monitoring, or repair or replacement in near future is necessary. The damage value indicates a level of a second stage showing that the device or process corresponding to the acquired field information deteriorates. When this damage value is reached, this means that repair or replace of the device or process is necessary.

Thus, the collection and analysis server device 250 may compare pieces of field information respectively associated with a plurality of workpieces in a predetermined facility with each other to implement a monitoring function for monitoring a trend that may occur in the facility. By implementing such a function, various measures can be performed before facility failure occurs, and a probability of unexpectedly occurring facility failure can be reduced.

The present invention is not limited to the trend monitoring function, and a function of monitoring and notifying that a predetermined deterioration level has been reached may be implemented.

<H. KPI Calculation Process>

As described above, the management system 1 according to the embodiment enables entity management of each workpiece included in each order in the manufacturing line 100 for order management. With such entity management, it is possible to accurately calculate key performance indicators (KPI). Hereinafter, the KPI calculation process will be described.

The management system 1 according to the embodiment can calculate the KPI defined by International Organization for Standardization (ISO)-22400. In ISO-22400, 34 types of indicators are defined as KPIs, and the management system 1 can calculate any of indicators. However, hereinafter, the following five types of indicators for use in production management in the manufacturing line will be described.

(1) Allocation Ratio

An allocation ratio is an indicator for measuring whether the device is properly arranged and performs efficient production within a minimum time, and means a ratio of an actual unit busy time (AUBT) of the facility to an actual order execution time (AOET).

Allocation ratio=Actual unit busy time of device/ Actual order execution time (2) Throughput Rate A throughput rate is an indicator for measuring the amount of capability with which the device can produce products per hour, and means a products quantity of the facility relative to the actual order execution time.

Throughput rate=products quantity/actual order execution time (3) Quality Factor (Or Good Product Rate)

A quality ratio is an indicator for measuring performance as to whether a device is producing a good product, and means a good product throughput rate of the facility.

Quality factor=good quantity/products quantity (4) Scrap Ratio (Or Bad Product Ratio)

The scrap ratio is an indicator for measuring performance as to whether the device is producing a good product, and means a throughput rate of bad products in the facility.

Scrap ratio=scrap quantity/products quantity (5) Rework Ratio

A rework ratio is an indicator for measuring a loss amount due to addition of the post-workpiece even when a bad product can be finally recovered to a good product, and means the rework quantity to the products quantity of the facility.

Rework ratio=rework quantity/products quantity

In addition to the KPI defined in ISO-22400 described above, a scrap ratio after rework to the products quantity of the facility may be calculated. The scrap ratio to the products quantity of the facility is an indicator for measuring the loss amount of the manufacturing line which has failed the production.

Figure 22:
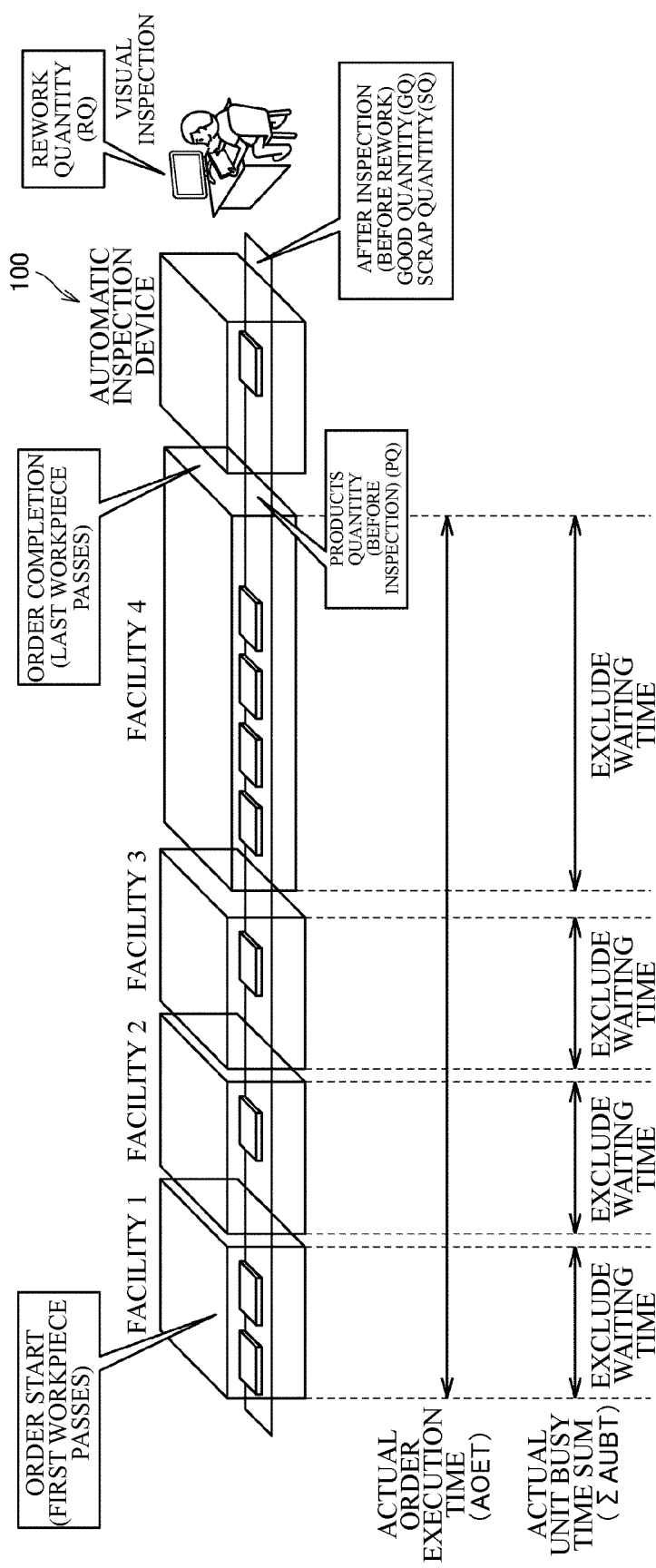
FIG. 22 is a schematic diagram illustrating a process of calculating a KPI in the management system according to the embodiment.

Scrap ratio to products quantity of facility=number of scraps after rework/products quantity Hereinafter, a procedure of calculating each indicator will be described with reference to the drawings. FIG. 22 is a schematic diagram illustrating a process of calculating the KPI in the management system 1 according to the embodiment. In the manufacturing line 100 illustrated in FIG. 22, it is assumed that facilities 1 to 4 for executing various processing processes for the workpiece are arranged, and after the processing processes in facilities 1 to 4, an inspection in an automatic inspection device and a visual inspection of a person in charge are executed.

(h1: Procedure of Calculating Allocation Ratio)

To calculate the allocation ratio, the actual order execution time, and the actual unit busy time of the device are required.

Since the actual order execution time means a time required for production according to a certain order, and can be regarded, for example, a period from a time at which the process in the manufacturing line 100 for the first workpiece has been started according to an order to a time at which a process for all the workpieces has been completed according to the order. That is, on the basis of the collected event information, the collection and analysis server device 250 calculates the actual unit busy time (AUBT) of the facility corresponding to a time when the process has been actually performed on each workpiece in one or a plurality of facilities.

In the example illustrated in FIG. 22, for example, a time at which the first workpiece according to a certain order has passed through an input port of facility 1 can be set as a start point of the actual order execution time ("order start" in FIG. 22), and a time at which the last workpiece according to the order has passed through a discharge port of facility 4 can be set to an end point of the actual order execution time ("order completion" in FIG. 22).

Since the management system 1 according to the embodiment performs entity management for each workpiece, it is possible to calculate a processing time in units of workpiece in each device as the actual unit busy time of the device.

FIG. 23 is a schematic diagram illustrating a method of calculating the actual unit busy time of the device in the management system 1 according to the embodiment.

Referring to the part (A) of FIG. 23, when the target device can process only one workpiece at a time (that is, cannot simultaneously process a plurality of workpieces), a period from a process start time to a process end time for each workpiece can be regarded as the actual unit busy time (AUBT_n) for the workpiece. Therefore, the actual unit busy time of each device can be calculated as a sum (that is, ΣAUBT_n) of the actual unit busy time for each workpiece.

Thus, the collection and analysis server device 250 calculates the actual unit busy time of the facility corresponding to a time when the process has been actually performed from an integrated value of a period from the start of the process to the completion of the process in the target facility, for each of one or a plurality of workpieces processed according to the same order information 400.

Meanwhile, referring to the part (B) of FIG. 23, for a device capable of simultaneously processing a plurality of workpieces, when the actual unit busy time for the respective workpieces is simply summed up, an erroneous value is calculated by the overlapping period. Therefore, the actual unit busy time of each device may be calculated as a value obtained by subtracting a sum of overlapping periods (that is, E overlapping period) from a sum (that is, ΣAUBT_n) of the actual unit busy time for the respective workpieces.

As an actual unit busy time of an actual device, a time for which the device is waiting or stopping due to some reasons (waiting for member supply, setup change, dealing with a problem, or the like) is excluded. Normally, when the tracking database 290 as illustrated in FIG. 11 can be generated, such a s topping time is naturally excluded, and therefore, it is not necessary to take special consideration. However, when the device stops for some reasons from the start of the process of any workpiece to the completion, a stop period is not recorded in the tracking database 290, and therefore, the waiting or stopping time may be calculated on the basis of information from the PLC that controls the device, information from the production management server device, a difference between a process start time and a processing completion time, and the like, and correction may be performed using the calculated time.

Since the actual order execution time and the actual unit busy time of the device can be calculated by the above procedure, the allocation ratio can be calculated from these values. That is, the collection and analysis server device 250 determines the allocation ratio that is defined as the KPI on the basis of the time required for the process according to the order information 400 and the actual unit busy time of the facility corresponding to the time in which the process has been actually performed for each workpiece.

The actual unit busy time of the device can be calculated for each device arranged in the manufacturing line 100 or can be calculated for the entire manufacturing line 100. That is, by using the management system 1 according to the embodiment, it is possible to calculate both the allocation ratio of each device arranged in the manufacturing line 100 and the allocation ratio of the entire manufacturing line 100, and one or both of the allocation ratios may be calculated and presented according to a need of the administrator.

(h2: Throughput Rate)

To calculate the throughput rate, the actual order execution time and products quantity are required. Since the method of calculating the actual order execution time has been described above, description thereof will not be repeated herein.

The products quantity can be defined from a plurality of viewpoints, but in the manufacturing line 100 illustrated in FIG. 22, the number of workpieces for which the process in facilities 1 to 4 has been completed is defined as the products quantity (PQ) (before the inspection). That is, for a certain order, a total number of workpieces discharged from facility 4 can be calculated as the products quantity.

Since the actual order execution time and the products quantity can be calculated by the above procedure, the throughput rate can be calculated from these values.

(h3: Quality Ratio/Good Product Ratio)

To calculate the quality ratio/good product ratio, the products quantity and the good quantity are required. Since the method of calculating the products quantity has been described above, description thereof will not be repeated herein.

The good quantity can be defined from a plurality of viewpoints, but in the manufacturing line 100 illustrated in FIG. 22, the number of workpieces determined to be "good products" in the automatic inspection device is defined as good quantity (GQ) (after the inspection and before the rework). That is, for a certain order, a total number of workpieces determined to be good products by the automatic inspection device among the workpieces discharged from facility 4 can be calculated as the good quantity.

Since the products quantity and the good quantity can be calculated in the procedure as described above, the quality ratio/good product ratio can be calculated from these values.

(h4: Scrap Ratio/Bad Product Ratio)

To calculate the scrap ratio/bad product ratio, the products quantity and the scrap quantity are required. Since the method of calculating the products quantity has been described above, description thereof will not be repeated herein.

The scrap quantity can be defined from a plurality of viewpoints, but in the manufacturing line 100 illustrated in FIG. 22, the number of workpieces determined as "bad products" in the automatic inspection device is defined as scrap quantity (SQ) (after inspection and before rework). That is, for a certain order, a total number of workpieces determined to be bad products by the automatic inspection device among the workpieces discharged from facility 4 can be calculated as the scrap quantity.

Since the products quantity and the scrap quantity can be calculated in the procedure as described above, it is possible to calculate the scrap ratio/bad product ratio from these values.

(h5: Rework Ratio)

To calculate the rework ratio, the products quantity and the rework quantity are required. Since the method of calculating the products quantity has been described above, description thereof will not be repeated herein.

The rework quantity can be defined from a plurality of viewpoints, but in the manufacturing line 100 illustrated in FIG. 22, the number of workpieces determined to be a small problem as a result of a visual inspection of the person in charge and reworked among the workpieces determined as "bad products" in the automatic inspection device is defined as the rework quantity (RQ). That is, for a certain order, it is possible to calculate the number of reworked workpieces among the workpieces determined to be bad products by the automatic inspection device as the rework quantity.

Since the products quantity and the rework quantity can be calculated in the procedure as described above, the reworking ratio can be calculated from these values.

(h6: Scrap Ratio to Products Quantity of Facility)

In order to calculate the scrap ratio to the products quantity of the facility, the products quantity and the scrap quantity after rework are required. Since the method of calculating the products quantity has been described above, description thereof will not be repeated herein.

The scrap quantity after rework can be defined from a plurality of viewpoints, but in the manufacturing line 100 illustrated in FIG. 22, the number of workpieces determined to have a small problem as a result of a visual inspection of the person in charge, and reworked, but eventually discarded due to the problem not being resolved among the workpieces determined as "bad products" in the automatic inspection device is defined as the scrap quantity after rework. That is, for a certain order, the number of workpieces tried to be reworked but cannot be good products among the workpieces determined to be bad products by the automatic inspection device can be calculated as the scrap quantity after rework.

Since the products quantity and the scrap quantity after rework can be calculated in the procedure as described above, it is possible to calculate the scrap ratio to the products quantity of the facility from these values.

<I. Comparison Between Manufacturing Lines>

Although the method of entity management for each workpiece included in each order for one manufacturing line, the method of calculating the KPI, and the like have been described, but the management system 1 may manage a plurality of manufacturing lines. In particular, the KPI is an indicator that is calculated according to an international standard, and it is possible to facilitate pursuit of a problem of each manufacturing line or the like by comparing the KPIs of manufacturing lines with each other and the KPIS of factories (manufacturing bases) including one or a plurality of manufacturing lines with each other.

Figure 24:
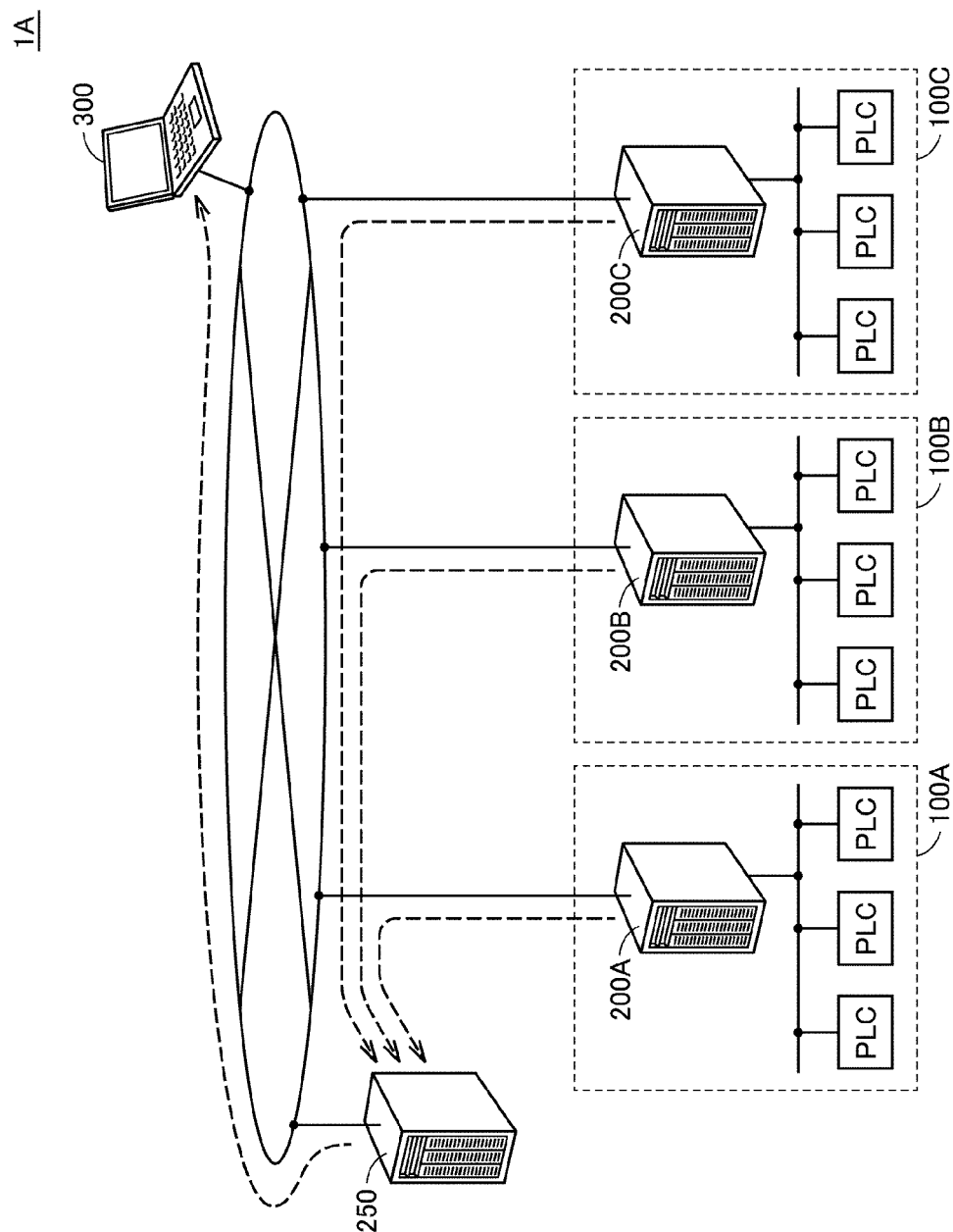
FIG. 24 is a schematic diagram illustrating a configuration example of a management system according to the embodiment.

FIG. 24 is a schematic diagram illustrating a configuration example of the management system 1A according to the embodiment. Referring to FIG. 24, in the management system 1A, the collection and analysis server device 250 is associated with a plurality of manufacturing lines 100A to 100C, collects and analyzes event information from each of the plurality of manufacturing lines 100A to 100C, and provides an analysis result for each manufacturing line to the terminal device 300.

Necessary information is added to the event information from the PLC served by the relay server devices 200A to 200C respectively arranged in the manufacturing lines 100A to 100C, and the resultant event information is transmitted to the collection and analysis server device 250.

The collection and analysis server device 250 may generate an analysis result for each of the manufacturing lines 100A to 100C and provide the analysis result to the terminal device 300 in a comparable aspect.

The plurality of manufacturing lines 100A to 100C illustrated in FIG. 24 may be arranged in the same factory or may be arranged in a plurality of different manufacturing bases. Further, since necessary information is exchanged via the network, the plurality of manufacturing bases may be distributed over a plurality of countries or regions.

Further, by combining a data anonymization scheme, it is possible to compare, for example, the KPIs with each other between manufacturing lines and factories of different companies or organizations.

<J. User Interface>

Next, an example of a user interface of an analysis result that the collection and analysis server device 250 provides to the terminal device 300 will be described. The user interface exemplified below can be applied to a case in which a single manufacturing line as illustrated in FIG. 1 is managed, and can also be applied to a case in which a plurality of manufacturing lines as illustrated in FIG. 24 are managed.

FIGS. 25 to 28 are diagrams illustrating examples of a user interface screen that is provided by the management system 1 according to the embodiment. As an example, the management system 1 according to the embodiment provides the user interface screens 600A to 600C as illustrated in FIGS. 25 to 28 to the terminal device 300 or the like. The user interface screens 600A to 600C may freely switch the display by selecting the tabs 601 to 603 in a lower portion of the screen.

Figure 25:
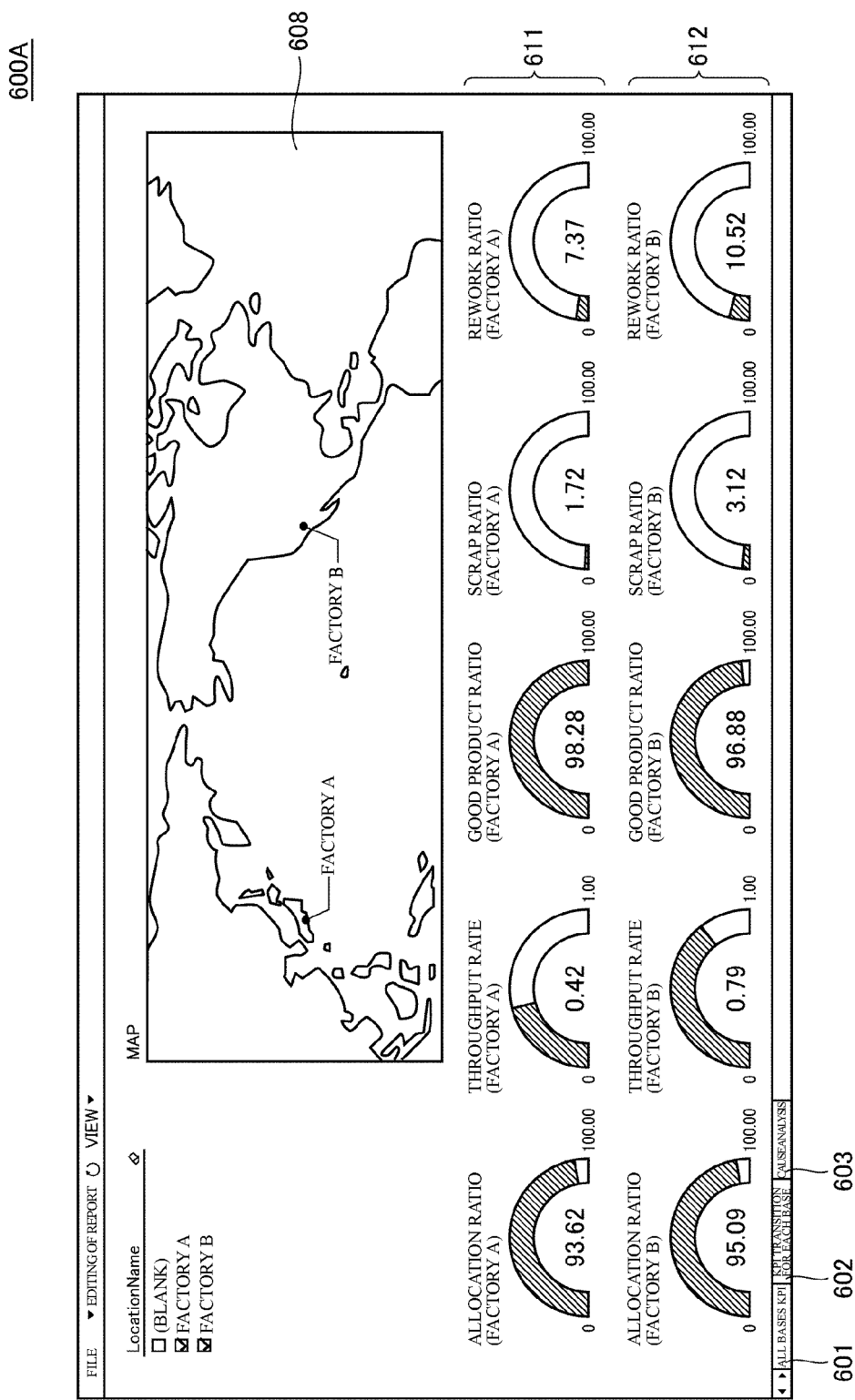
FIG. 25 is a diagram illustrating an example of a user interface screen that is provided by the management system according to the embodiment.

Referring to FIG. 25, the user interface screen 600A that is displayed by selecting the tab 601 displays the KPI at each of the manufacturing bases (or manufacturing lines or factories) that are management targets. In the user interface screens 600A to 600C, examples in which factory A and factory B are managed are shown.

More specifically, the user interface screen 600A includes a KPI display area 611 for displaying each of the KPIs for factory A using a pie chart and a numerical value, and a KPI display area 612 for displaying each of the KPIs for factory B using a pie chart and a numerical value.

As the KPI, the five indicators described above are displayed in a comparable aspect between factory A and factory B. As illustrated in FIG. 25, by comparing each indicator of KPI between the manufacturing bases, the administrator can easily specify the manufacturing base that is a facility improvement target, the device, and the like. Positions of factory A and factory B are marked as supplemental information in the map screen 608.

Thus, the collection and analysis server device 250 has a display function of displaying a plurality of indicators defined in the KPI. In this display function, typically, a plurality of indicators are displayed side by side or in an overlapping manner. Further, this display function is also capable of displaying indicators defined by the KPI calculated for each of a plurality of manufacturing lines side by side or in an overlapping manner.

Figure 26:
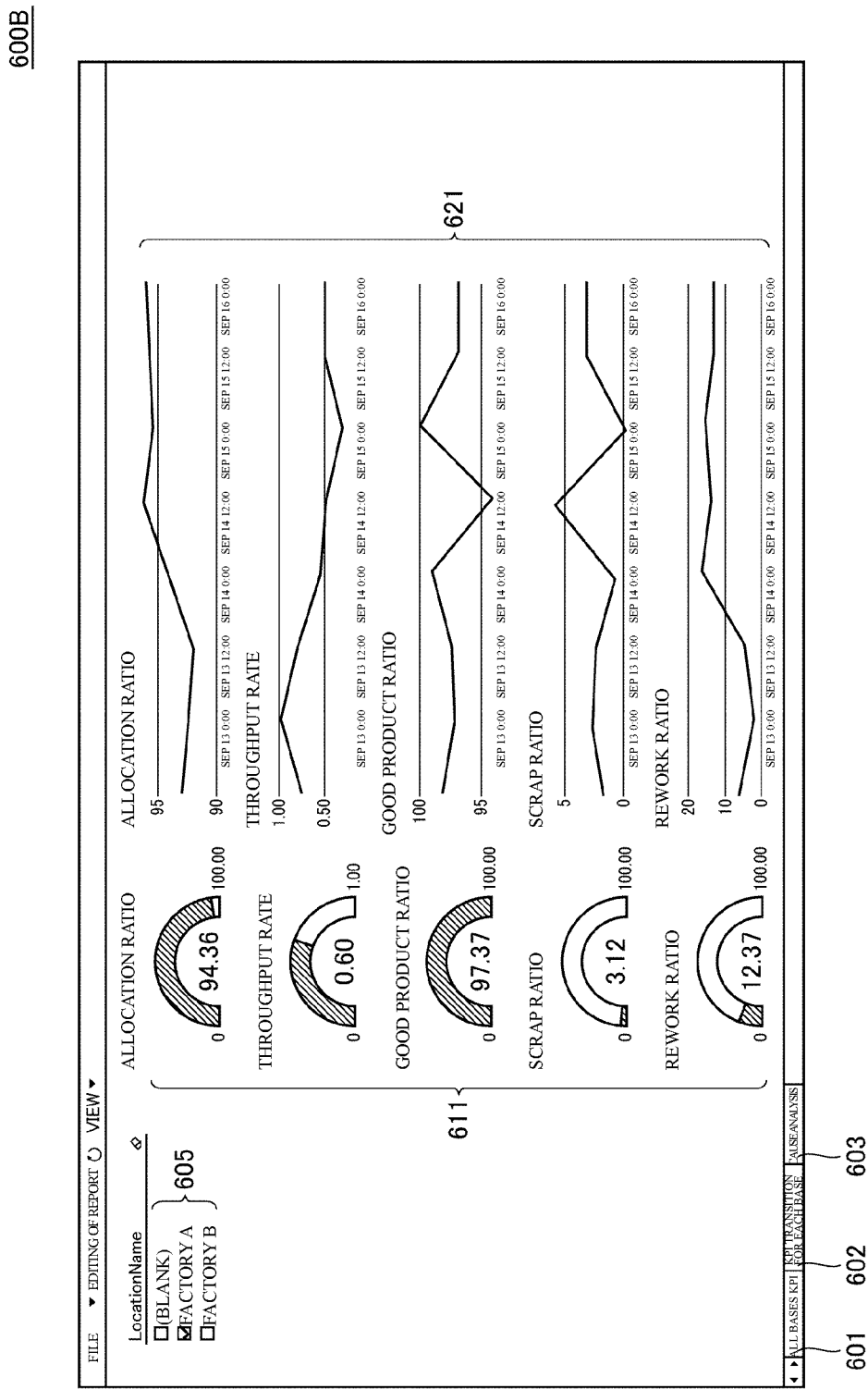
FIG. 26 is a diagram illustrating an example of a user interface screen that is provided by the management system according to the embodiment.

Referring to FIG. 26, a user interface screen 600B that is displayed by selecting a tab 602 displays details of the KPI at the selected manufacturing base among the manufacturing bases that are management targets. More specifically, in the user interface screen 600B, a current value of each indicator of the KPI (or a value calculated for any period) is displayed similar to the KPI display area 611 in FIG. 25, and a trend value (past record value) 621 of each indicator of the KPI is graphically displayed. In this graphical display, a common time axis is set, and a temporal change in each indicator of the KPI can be compared with each other.

The user interface screen 600B includes a check box group 605 for selecting a manufacturing base, and can also display the respective indicators of the KPI side by side for one or a plurality of manufacturing bases selected by the user.

Figure 27:
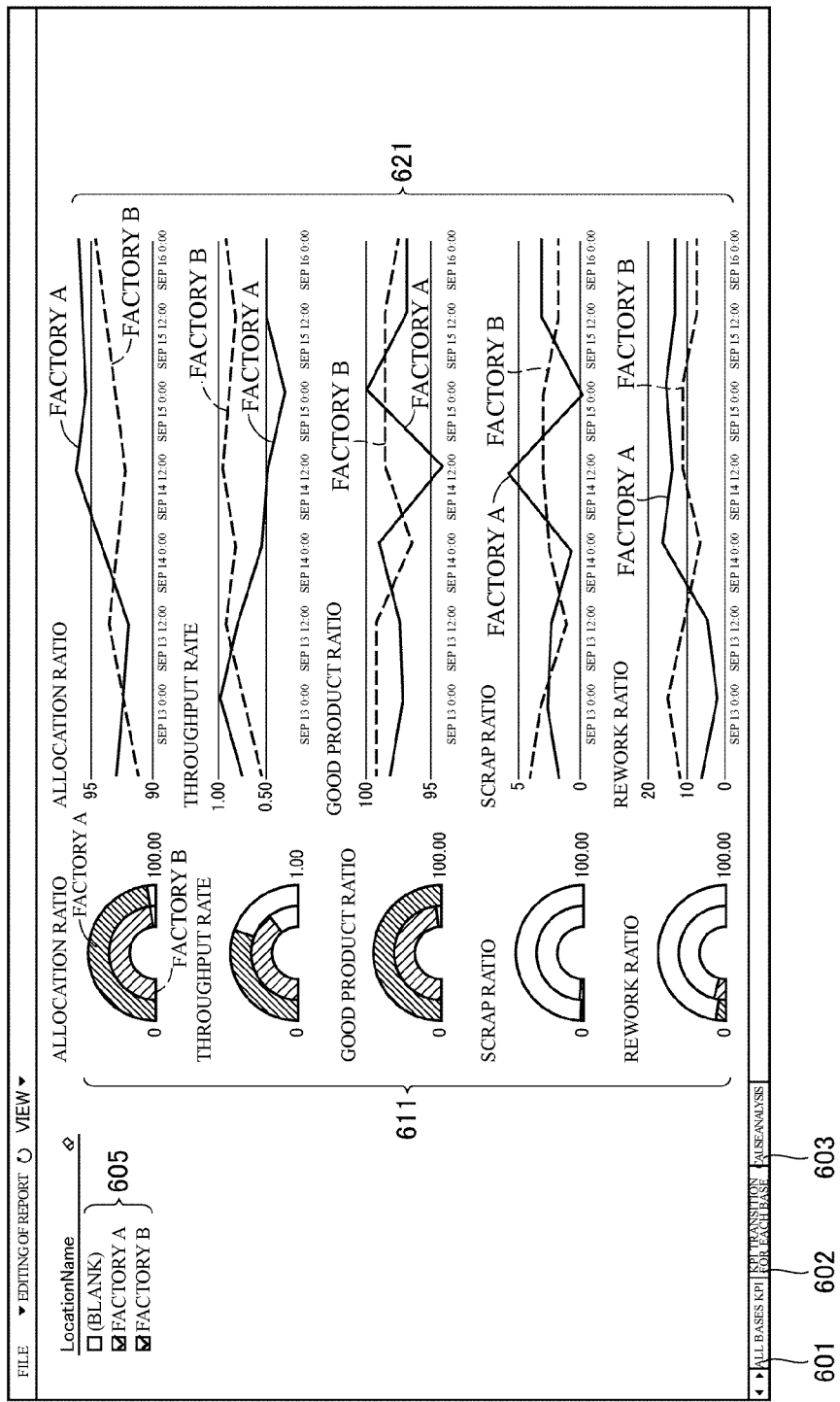
FIG. 27 is a diagram illustrating an example of a user interface screen that is provided by the management system according to the embodiment.

As illustrated in FIG. 27, when a plurality of check boxes are selected in the check box group 605 included in the user interface screen 600B, the respective indicators of the KPI for a plurality of manufacturing bases can be displayed in an overlapping manner. More specifically, for each manufacturing base, a trend value (past record value) 621 of each indicator of KPI is graphically displayed on the same coordinates for each indicator. In this graphical display, a common time axis is set, and a temporal change in each indicator of the KPI can be compared between the manufacturing bases.

Further, the current values (or values calculated for any period) of each indicator of the KPI are displayed side by side to be compared between the manufacturing bases in the KPI display area 611. It is preferable that the values of the respective indicators of the KPI displayed in the KPI display area 611 be values calculated or acquired at substantially the same timing.

Figure 28:
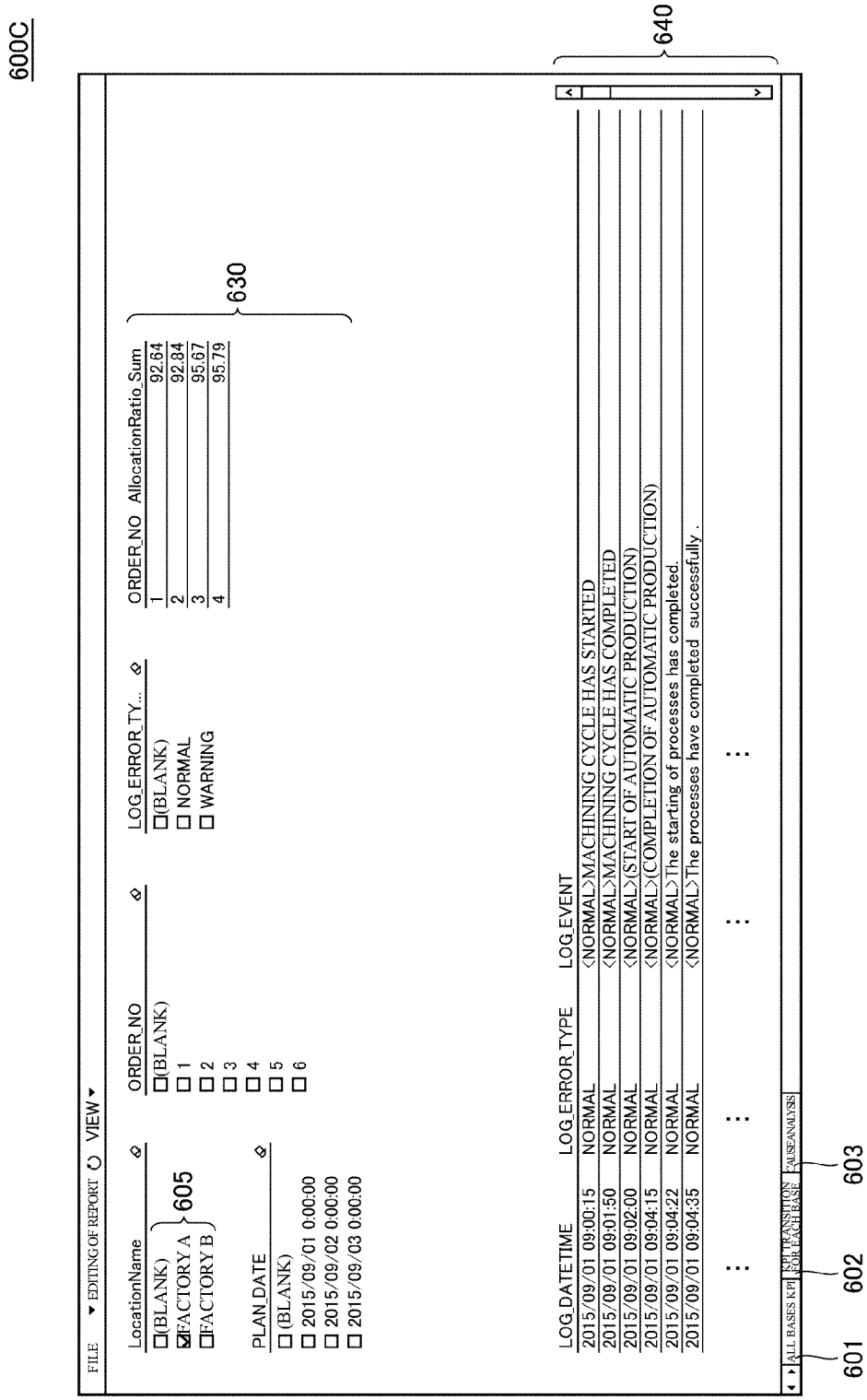
FIG. 28 is a diagram illustrating an example of a user interface screen that is provided by the management system according to the embodiment.

Referring to FIG. 28, when a problem or the like occurs, the user interface screen 600C displayed by selecting the tab 603 provides information for supporting analysis of a cause of the problem. Specifically, the user interface screen 600C includes a check box group 630 for designating various conditions, and event information matching a condition selected by the user in the check box group 630 is displayed as a list in the log display area 640.

The administrator can refer to the event information displayed as the list in the log display area 640 to specify a reason for the problem of the target.

By providing the user interface screens 600A to 600C as described above to the administrator or the like, it is possible to recognize what is happening at a manufacturing site in real time, and to efficiently plan future facility investment by comparing productivity or the like with that of another manufacturing base using the KPI that is a common indicator.

<K. Summary>

Hereinafter, several aspects that can be included in the present invention are summarized.

(1) Entity Management

In a case where the production management is performed in units called the "order" in which a predetermined number of the same type of workpieces are grouped, even when a problem occurs in a certain order unit, one of the plurality of workpieces included in the order in which the problem occurs cannot be easily recognized.

Therefore, a management system capable of realizing finer production management is desired even at a manufacturing site at which the production management is performed in units of order.

In response to such desire, a management system associated with a manufacturing line including one or a plurality of facilities is provided. In this management system, one or a plurality of facilities is configured to process individual workpieces according to order information including the designation of a type of manufacture target and designation of the number of manufacturing targets. This management system includes a collection function for collecting event information regarding a process generated in one or a plurality of facilities, a classifying function for classifying the event information collected by the collection function into a set of event information generated due to the same workpiece on the basis of the generation source and the content of each piece of event information, a generation function for generating data indicating the process status of each workpiece on the basis of the event information belonging to each of the sets classified by the classification function, and a visualization function for visualizing the progress status of the process for each workpiece processed according to the order information on the basis of the data generated by the generation function.

By adopting the above-described management system, it is possible to facilitate production management in units of workpiece included in units of order.

(2) KPI Calculation

Various schemes and indicators have been proposed as schemes and indicators for evaluating the productivity of the manufacturing line in the related art, but the schemes and indicators are often unique to a manufacturing line or a company, and it is not easy to perform relative evaluation with respect to other manufacturing lines, such as evaluation that the productivity is higher or lower relative to the other manufacturing lines. Therefore, it is originally impossible to compare productivities of similar manufacturing lines with each other between different companies. Therefore, a management system that can objectively evaluate and manage each manufacturing site is desired.

In response to such desire, a management system associated with a manufacturing line including one or a plurality of facilities is provided. In this management system, one or a plurality of facilities is configured to process individual workpieces according to order information including the designation of a type of manufacture target and designation of the number of manufacturing targets. This management system includes a collection function for collecting event information generated in one or a plurality of facilities, a calculation function for calculating a time for which the process has been actually performed on each workpiece in one or a plurality of facilities on the basis of the even information collected by a collecting means, and a determination function for determining the allocation ratio defined as key performance indicators (KPI) on the basis of a time required for a process according to the order information and the time calculated by a calculation means.

By adopting the management system described above, each manufacturing site can be objectively evaluated and managed using the KPI which is an indicator calculated according to an international standard.

(3) Comparison Between Manufacturing Bases, Comparison Between Manufacturing Lines, and Comparison Between Factories Various improvement activities have been performed at a manufacturing site in the related art. When there is any information for comparison and reference in performing such improvement activity, the information helps to determine whether improving a certain facility is beneficial. However, such a system has not existed so far. Therefore, the improvement activity has often been performed on the basis of experience of an expert.

In response to such a desire, a management system associated with a plurality of manufacturing lines including one or a plurality of facilities is provided. This management system has a collection function for collecting event information generated in each of the plurality of manufacturing lines, a calculation function of calculating an indicator (typically, an indicator defined as an KPI) for each of the plurality of manufacturing lines on the basis of the event information collected by the collecting function, and a display function for displaying the respective calculated indicators of the plurality of manufacturing lines side by side.

(4) Application of Collection Process and Analysis Process

Although the case in which the production management is performed for each workpiece included in each order at the manufacturing site at which the production management is performed in units of order has been illustrated in the above description, the collection process and the analysis process described above can also be applied to a manufacturing site at which the entity management has been already performed. That is, in the management system according to the embodiment, entity management for each workpiece can be performed as long as event information of which a generation source and content can be specified can be collected, and the above-described process can be performed even when information for specifying orders and workpieces within each order is included in some or all of the event information to be collected.

Other aspects of the present invention will be readily understood when those skilled in the art consider the entirety of the present specification.

By adopting the above-described management system, it is possible to provide information for supporting improvement activities.

It should be considered that the disclosed embodiments are illustrative in all respects and not restrictive. The scope of the present invention is indicated by the claims rather than the above description, and all modifications within meaning and scope equivalent to the claims are intended to be included.

What is claimed is:

1. A management system associated with a manufacturing line including one or a plurality of facilities, each of the one or plurality of facilities being configured to process individual workpieces according to order information including designation of a type of manufacturing targets and designation of the number of manufacturing targets, the management system comprising a collection and analysis server device, wherein the collection and analysis server device comprises a processor, and the processor is configured to:
   collect event information notified by a hardware control device designated to each of the one or plurality of facilities regarding a process generated in each of the one or plurality of facilities, wherein the event information comprises date and time of occurrence and identification information indicating a facility at which event information has occurred;
   classify the event information collected from the one or the plurality of facilities into a set of event information in a chronological order due to the same workpiece on the basis of a generation source and content of each piece of event information;
   generate data indicating a process status of each workpiece on the basis of event information belonging to each of sets classified;
   interpolate a time of occurrence of missing event information and a facility at which the missing event information has occurred according to the process status of each workpiece when the hardware control device fails to notify the event information;
   update the generated data;
   and
   visualize a progress status of a process for each workpiece to be processed according to the order information on the basis of the updated data.

2. The management system according to claim 1, wherein the processor is configured to classify the collected event information according to a configuration of the one or the plurality of facilities in the manufacturing line.

3. The management system according to claim 2, wherein the processor is configured to reproduce processing progress of each workpiece on the manufacturing line on a plane defined by an axis associated with process and an axis of time.

4. The management system according to claim 2, wherein the processor is configured to display a list of event information classified into a set corresponding to a selected workpiece.

5. The management system according to claim 2, wherein the processor is configured to specify an order number to which the set classified belongs and a workpiece number within the order on the basis of information on a time included in the order information.

6. The management system according to claim 2, wherein the processor is further configured to collect field information acquired in the one or the plurality of facilities, and
   execute a process of associating the collected field information with a corresponding workpiece.

7. The management system according to claim 1, wherein, when the processor is configured to receive event information having the same content from the same generation source a plurality of times, the processor is configured to classify each piece of the event information into event information caused by different workpieces.

8. The management system according to claim 1, wherein the processor is configured to reproduce processing progress of each workpiece on the manufacturing line on a plane that is defined by an axis associated with process and an axis of time.

9. The management system according to claim 1, wherein the processor is configured to display a list of event information classified into a set corresponding to a selected workpiece.

10. The management system according to claim 1, wherein the processor is configured to specify an order number to which the set classified belongs and a workpiece number within the order on the basis of information on a time included in the order information.

11. The management system according to claim 1, wherein the processor is further configured to collect field information acquired in the one or the plurality of facilities, and
   execute a process of associating the collected field information with a corresponding workpiece.

12. The management system according to claim 11, wherein the processor is configured to display the associated field information in response to selection of the workpiece.

13. The management system according to claim 11, wherein the hardware control device is configured to compare pieces of field information associated with a plurality of workpieces in a predetermined facility with each other to monitor a trend occurring in the facility.

14. A management method in a manufacturing line including one or a plurality of facilities, each of the one or plurality of facilities being configured to process individual workpieces according to order information including designation of a type of manufacturing targets and designation of the number of manufacturing targets, the management method comprising:
   collecting event information notified by a hardware control device designated to each of the one or plurality of facilities regarding a process generated in each of the one or plurality of facilities, wherein the event information comprises date and time of occurrence and identification information indicating a facility at which event information has occurred;
   classifying the event information collected from the one or the plurality of facilities into a set of event information in a chronological order due to the same workpiece on the basis of a generation source and content of each piece of event information;
   generating data indicating a process status of each workpiece on the basis of event information belonging to each of sets classified;

interpolating a time of occurrence of missing event information and a facility at which the missing event information has occurred according to the process status of each workpiece when the hardware control device fails to notify the event information;

updating the generated data;

and visualizing a progress status of a process for each workpiece to be processed according to the order information on the basis of the updated data.

15. A management system associated with a manufacturing line including one or a plurality of facilities, each of the one or plurality of facilities being configured to process individual workpieces according to order information including designation of a type of manufacturing targets and designation of the number of manufacturing targets, the management system comprising a collection and analysis server device, wherein the collection and analysis server device comprises a processor, and the processor is configured to:

collect event information notified by a hardware control device designed to each of the one or plurality of facilities regarding a process generated in each of the one or plurality of facilities;

classify the event information collected from the one or the plurality of facilities into a set of event information in a chronological order due to the same workpiece on the basis of a generation source and content of each piece of event information;

generate data indicating a process status of each workpiece on the basis of event information belonging to each of sets classified;

calculate a time at which a process is actually performed on each workpiece in each of the one or plurality of facilities on the basis of the process status of each workpiece;

determine an allocation ratio defined as a key performance indicator on the basis of the time required for the process and the order information, and visualize an actual busy time of the facilities using the allocation ratio.

16. The management system according to claim 15, wherein the processor is configured to calculate a time when the process has been actually performed from an integrated value of a period from start of the process to completion of the process in a target facility, for each of one or a plurality of workpieces processed according to the same order information.

17. The management system according to claim 16, wherein the processor is configured to determine another indicator defined as a key performance indicator, in addition to the allocation ratio, and the management system further comprises:

a display to display a plurality of indicators determined by the determination means side by side or in an overlapping manner.

18. The management system according to claim 15, wherein the processor is configured to determine another indicator defined as a key performance indicator, in addition to the allocation ratio, and the management system further comprises:

a display to display a plurality of indicators determined by the processor side by side or in an overlapping manner.

19. The management system according to claim 18, wherein the management system is associated with a plurality of manufacturing lines, and the display displays indicators calculated for each of the plurality of manufacturing lines side by side or in an overlapping manner.

20. A management system according to claim 15, wherein the allocation ratio is a ratio of the actual busy time of the facilities to an actual order execution time.

21. A management method in a manufacturing line including one or a plurality of facilities, each of the one or plurality of facilities being configured to process an individual workpiece according to order information including designation of a type of manufacturing targets and designation of the number of manufacturing targets, the management method comprising:

collecting event information notified by a hardware control device designed to each of the one or plurality of facilities regarding a process generated in each of the one or plurality of facilities;

classify the event information collected from the one or the plurality of facilities into a set of event information in a chronological order due to the same workpiece on the basis of a generation source and content of each piece of event information;

generate data indicating a process status of each workpiece on the basis of event information belonging to each of sets classified;

calculating a time at which a process is actually performed on each workpiece in each of the one or plurality of facilities on the basis of the process status of each workpiece;

determining an allocation ratio defined as a key performance indicator on the basis of the time required for the process and the order, and visualize an actual busy time of the facilities using the allocation ratio.

22. A management system according to claim 21, wherein the allocation ratio is a ratio of the actual busy time of the facilities to an actual order execution time.

* * * * *